US012791149B2

(12) United States Patent
Sartorius et al.

(10) Patent No.: US 12,791,149 B2
(45) Date of Patent: Nov. 10, 2026

(54) VESSELS WITH CONCAVE ELEMENTS AND SYSTEMS INCLUDING THE SAME

(71) Applicant: The Boeing Company, Arlington, VA (US)

(72) Inventors: Thomas Skyler Sartorius, San Luis Obispo, CA (US); Robert E. Grip, Rancho Palos Verdes, CA (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 19/052,129

(22) Filed: Feb. 12, 2025

(65) Prior Publication Data

US 2026/0235257 A1 Aug. 13, 2026

(51) Int. Cl.

| | |
|---|---|
| ***F17C 1/08*** | (2006.01) |
| ***B64D 37/02*** | (2006.01) |
| ***B64D 37/04*** | (2006.01) |

(52) U.S. Cl.

CPC ................ *F17C 1/08* (2013.01); *B64D 37/02* (2013.01); *B64D 37/04* (2013.01); *F17C 2201/0152* (2013.01); *F17C 2203/013* (2013.01); *F17C 2203/0391* (2013.01); *F17C 2203/0629* (2013.01); *F17C 2221/012* (2013.01); *F17C 2223/0161* (2013.01); *F17C 2270/0189* (2013.01)

(58) Field of Classification Search

CPC ...................................................... B64D 37/02

See application file for complete search history.

(56) References Cited

U.S. PATENT DOCUMENTS

| | | | | | |
|---|---|---|---|---|---|
| 3,979,005 | A * | 9/1976 | Robinson | B64D 37/06 | 220/560.07 |
| 4,773,952 | A * | 9/1988 | Wesley, Jr. | F17C 3/08 | 220/62.19 |
| 4,933,040 | A * | 6/1990 | Wesley, Jr. | B29C 53/602 | 220/62.19 |
| 5,975,466 | A * | 11/1999 | Kahara | B64D 37/02 | 244/135 R |
| 6,123,295 | A * | 9/2000 | Wexler | B64C 1/061 | 244/119 |
| 6,595,382 | B2 * | 7/2003 | Ettlinger | F17C 1/08 | 220/560.11 |
| 2003/0005933 | A1 * | 1/2003 | Izuchukwu | F17C 1/02 | 128/205.24 |
| 2016/0281926 | A1 * | 9/2016 | Croteau | F17C 1/00 | |

(Continued)

FOREIGN PATENT DOCUMENTS

| | | | | |
|---|---|---|---|---|
| DE | 19929421 | A1 * | 12/2000 | F17C 1/02 |

*Primary Examiner* — Richard G Davis

(74) *Attorney, Agent, or Firm* — Kolitch Romano Dascenzo Gates LLP

(57) ABSTRACT

Multi-walled storage tanks may include a pressure vessel having an inner volume surrounded by an inner shell. An outer shell may surround the inner shell, and a vacuum chamber may be present between the inner shell and the outer shell. The inner shell may have at least one concave surface, and/or the outer shell may have at least one concave surface. The concave surfaces may be locally and/or globally concave. The inner shell may include one or more lobes formed in the inner shell. Such multi-walled storage tanks may provide more weight-, drag-, and/or space-efficient storage, such as storage of alternative fuels such as cryogenic fuels.

20 Claims, 14 Drawing Sheets

(56) References Cited

U.S. PATENT DOCUMENTS

| | | | | |
|---|---|---|---|---|
| 2022/0348343 | A1* | 11/2022 | Kaneko | B64C 29/0016 |
| 2023/0184382 | A1* | 6/2023 | Gross | B64D 37/30 |
| 2024/0417097 | A1 | 12/2024 | Grip et al. | |
| 2024/0417098 | A1 | 12/2024 | Grip | |
| 2024/0418318 | A1 | 12/2024 | Grip et al. | |
| 2024/0418319 | A1 | 12/2024 | Grip et al. | |
| 2024/0418328 | A1 | 12/2024 | Grip et al. | |
| 2025/0058891 | A1* | 2/2025 | Balan | B64B 1/28 |

* cited by examiner

VESSELS WITH CONCAVE ELEMENTS AND SYSTEMS INCLUDING THE SAME

FIELD

The present disclosure relates to vessels with concave elements and systems including the same, and more particularly to multi-walled storage tanks with local and/or global concave elements.

BACKGROUND

Typical storage vessels or tanks that contain or resist pressure typically are difficult to integrate onto aircraft, and/or do not make efficient use of space on aircraft due to the shape of the storage vessels. For example, current vacuum-insulated cryogenic multi-walled storage tanks have round cross-sections (e.g., convex shapes) which are difficult to integrate into aircraft, and the outer shell is subject to buckling under ambient pressure. Efficiency in placement of conventional storage tanks may be particularly limited when the allocated space for the storage tanks is not itself rounded in nature or is already occupied by other structures or systems. Even tightly packing cylindrical tanks with flattened end caps results in a poor use of available volume. On the other hand, external tanks result in significant additional unused volume and associated weight and drag penalties.

SUMMARY

Presently disclosed multi-walled storage tanks may be configured to provide more weight-, drag-, and/or space-efficient storage, such as storage of alternative fuels such as liquid hydrogen or liquid methane on an aircraft. An example of a multi-walled storage tank according to the present disclosure may include a pressure vessel having an inner volume surrounded by an inner shell, where the inner shell has at least one concave surface. An outer shell may surround the inner shell, and a vacuum chamber may be present between the inner shell and the outer shell. Other examples of multi-walled storage tanks may include a pressure vessel having an inner volume surrounded by an inner shell, where the inner shell includes one or more lobes formed in the inner shell. An outer shell may surround the inner shell, and a vacuum chamber may be positioned between the inner shell and the outer shell. In another example, a multi-walled storage tank includes a pressure vessel having an inner volume surrounded by an inner shell, and an outer shell surrounding the inner shell. The outer shell may include at least one concave surface. A vacuum chamber may be present between the inner shell and the outer shell. Related systems and methods also are within the scope of the present disclosure.

DESCRIPTION

Multi-walled storage tanks are disclosed herein. Generally, in the figures, elements that are likely to be included in a given example are illustrated in solid lines, while elements that are optional to a given example or that correspond to one or more specific examples are illustrated in broken lines.

However, elements that are illustrated in solid lines are not essential to all examples of the present disclosure, and an element shown in solid lines may be omitted from a particular example without departing from the scope of the present disclosure.

Figure 1:
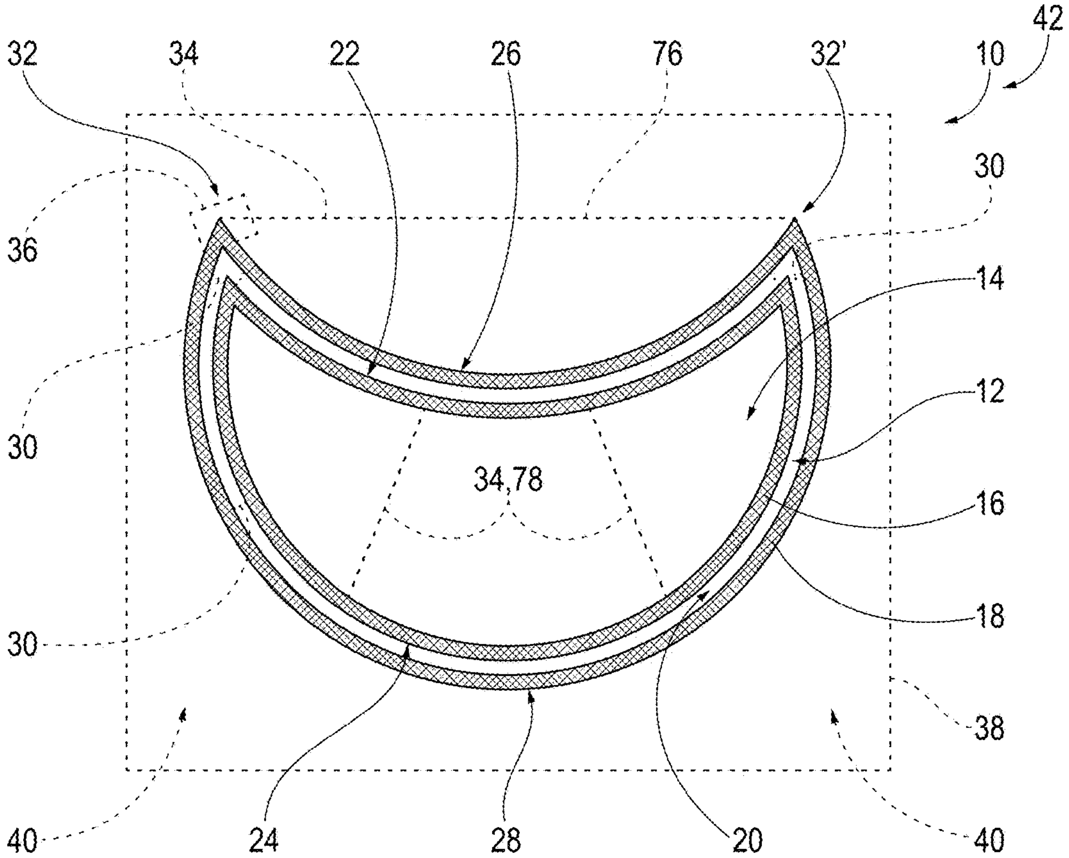
FIG. 1 is a schematic representation of examples of multi-walled storage tanks according to the present disclosure.

FIG. 1 schematically illustrates a cross-sectional view of a multi-walled storage tank 10 according to the present disclosure. Multi-walled storage tank 10 may be, for example, a vessel, a fuel tank, a fluid storge tank, a storage tank for storing gases, and/or a cryogenic fuel storage tank. In some examples, multi-walled storage tank 10 (which also may be referred to herein simply as storage tank 10) is configured to contain, or store, cryogenic and/or alternative fuels such as liquid hydrogen and/or liquid methane. Additionally or alternatively, storage tank 10 may be configured for use in association with an aircraft, such as by being configured to be positioned within or stored within the aircraft, coupled to the aircraft, and/or integrated into the aircraft structure.

Storage tank 10 includes a pressure vessel 12 having an inner volume 14 surrounded by an inner shell 16. Inner volume 14 generally is configured to contain fuel, fluids, gas, or other substances that storage tank 10 is configured to store. Pressure vessel 12 may have any suitable internal pressure within inner volume 14, though in some examples, the internal pressure is greater than 1 standard atmosphere (atm). An outer shell 18 surrounds inner shell 16, and a vacuum chamber 20 is positioned between inner shell 16 and outer shell 18. As used herein, "vacuum chamber" 20 is an evacuated volume between inner shell 16 and outer shell 18. In some examples, inner shell 16 includes at least one concave surface 22 and/or at least one convex surface 24. Additionally or alternatively, outer shell 18 may include at least one concave surface 26 and/or at least one convex surface 28. Concave surfaces 22, 26 may be globally concave, and/or locally concave. Similarly, convex surfaces 24, 28 may be globally convex and/or locally convex. As used herein, a surface is said to be "globally" concave or convex if the overall general shape is concave or convex, respectively. In other words, the "global" attributes may be said to relate to how the general shape of storage tank 10 may be integrated with an aircraft. As used herein, a surface is said to be "locally" concave or convex within a given portion, or section, of the surface if the portion or section is concave or convex, respectively. The "local" attributes of a surface may determine whether the skin forming that surface will be in tension or compression. In the schematic representation of FIG. 1, concave surfaces 22, 26 are both locally and globally concave, and convex surfaces 24, 28 are both locally and globally convex. In contrast, in the example shown in FIG. 13, inner shell 16 has a concave surface 22 that is globally concave, but not locally concave.

With continued reference to FIG. 1, storage tanks 10 may include at least one structural coupling 30 between inner shell 16 and outer shell 18. In some examples, storage tank 10 includes a plurality of structural couplings 30 located at a number of locations. Structural coupling 30 may be configured to partially or fully cancel out deforming forces experienced by multi-walled storage tank 10. Additionally or alternatively, structural coupling 30 may be, or include, one or more couplings at one or more apices, or vertices 32 of storage tank 10, which may be configured to balance flattening forces experienced by inner shell 16 from internal pressure within pressure vessel 12 with curling forces experienced by outer shell 18 from atmospheric pressure acting on storage tank 10 from the outside of storage tank 10. In some examples, structural couplings 30 may be configured to couple inner shell 16 and outer shell 18 together. Structural couplings 30 optionally are the only structures coupling inner shell 16 and outer shell 18 together, and such minimal structural coupling, especially when combined with integration of storage tank 10 with an airframe, can minimize net flattening forces experience by storage tank 10. Specifically, because of ambient pressure outside outer shell 18 and the vacuum inside outer shell 18, vertices 32 of outer shell 18 tend to experience forces that would curl the vertices together; meanwhile, the vacuum outside inner shell 16 (e.g., vacuum chamber 20) and the moderate pressure within inner volume 14 tend to create forces on inner shell 16 that would flatten inner shell 16 or move apart the vertices 32 of inner shell 16. The flattening forces acting on inner shell 16 tend to exceed the curling forces acting on outer shell 18, and structural couplings 30 can be used to minimize these net flattening forces. In some examples, structural couplings 30 between inner shell 16 and outer shell 18 are kept to a minimum in order to prevent or reduce creating thermal "shorts" between pressure vessel 12 (which is generally very cold, such as when storing cryogenic fuel) and outer shell 18 (which is generally much warmer than pressure vessel 12). While vacuum chamber 20 prevents thermal conduction between the two, any connection between pressure vessel 12 and outer shell 18 provides a path for disadvantageous thermal conduction between the two.

Additionally or alternatively, some examples of storage tank 10 include at least one dedicated external and/or internal structure 34 configured to counteract one or more deforming forces acting on multi-walled storage tank 10. For example, dedicated external and/or internal structures 34 may include tension members, internal struts, cross-braces, lobes, perforated webs, lobes, and/or tensile nets. In a specific example, dedicated external and/or internal structure 34 may be an external member 76, with said external member 76 optionally being an external tension member 76 designed to be in tension, or an external compression member 76 designed to be in compression. External member 76 may extend between a first vertex 32 and a second vertex 32' of outer shell 18, may be coupled to one or both vertices 32, 32', and/or may couple one or both vertices 32, 32' to a structure external to outer shell 18. In some examples, such an external tension member 76 may be configured to exert tension outwardly, such that external tension member 76 is configured to prevent first vertex 32 and second vertex 32' from moving towards each other, or to reduce an extent to which first vertex 32 and second vertex 32' move towards each other. In some examples, external tension member 76 may be configured to exert tension inwardly, such that external tension member 76 is configured to prevent or limit first vertex 32 and second vertex 32' from being pushed apart from each other due to internal pressure within inner volume 14 of pressure vessel 12. External tension member 76 may be configured to cancel out the net flattening forces acting on multi-walled storage tank 10 discussed above, and/or configured to facilitate integration of storage tank 10 with one or more aircraft structures. In examples where external member 76 is an external compression member 76, said external compression member 76 may be configured to carry compression such as in examples where outer shell 18 is mostly or fully structurally decoupled from inner shell 16.

Dedicated external and/or internal structure 34 additionally or alternatively may include one or more internal struts 78, each of which may be configured to mitigate flattening of multi-walled storage tank 10. Each internal strut 78 may extend within inner volume 14 of pressure vessel 12. For example, each internal strut 78 may extend from concave surface 22 of inner shell 16 to a second surface opposite concave surface 22, such as to convex surface 24 of inner shell 16. Internal struts 78 may be configured to exert tension pulling concave surface 22 towards convex surface 24, or otherwise towards the interior of pressure vessel 12. In some examples, internal struts 78 may be formed by cables, though other structures may be used to form internal struts 78, as will be understood by those of ordinary skill in the art. In some examples, dedicated internal and/or external structures 34 may interconnect concave surface 22 of pressure vessel 12 to convex surface 24 surface (or another surface opposite concave surface 22) as well as to one or more internal struts 78 within inner volume 14 of pressure vessel 12.

As shown in FIG. 1, storage tank 10 has a crescent-shaped cross-sectional area in some examples. In the example of FIG. 1, both inner shell 16 and outer shell 18 have crescent-shaped cross-sectional areas, though in some examples, pressure vessel 12 (e.g., inner shell 16) has a crescent-shaped cross-sectional area while outer shell 18 may have a different shape of cross section. Other shapes of cross-sectional areas for both inner shell 16 and outer shell 18 also are within the scope of the present disclosure, and may be selected to have a desired complementary shape for a portion of an aircraft that the storage tank will be integrated with or positioned against (e.g., a fuselage, or spherical or dome-capped aft tail cone tank). For example, other non-limiting examples of suitable shapes of cross-sectional areas for inner shell 16 and/or outer shell 18 may include circular, square, oval, and elliptical cross-sectional areas. In various examples of storage tank 10, inner shell 16 may have substantially the same shape as outer shell 18, or inner shell 16 may have a different shape than outer shell 18.

Outer shell 18 of storage tank 10 may be configured to be shared with, integrated with, conformed to, and/or nested with one or more aircraft structures, such as a fuselage skin of an aircraft. In some examples, multi-walled storage tank 10 is configured to be incorporated within, or positioned within, an aerodynamic fairing of an aircraft. To this end, storage tank 10 may include one or more vertex fittings 36 configured to couple multi-walled storage tank 10 to an aircraft structure or otherwise tie into the aircraft structure. In some examples, vertex fittings 36 may be configured to couple inner and outer shells 16, 18 (in addition to or instead of structural couplings 30 at vertices 32), to mount storage tank 10 and/or to tie into an external tension structure (e.g., dedicated internal and/or external structure 34).

Storage tank 10 may include a container 38 surrounding outer shell 18. Container 38 may have a square cross-sectional area and/or may be configured to be joined with or coupled to a second container for modular multi-walled storage tanks 10. Container 38 may be configured to support outer shell 18 at one or more corners (e.g., vertices 32) and/or one or more edges of outer shell 18. Additionally or alternatively, multi-walled storage tank 10 may be configured to receive and/or store one or more systems or other components in a space 40 between outer shell 18 and container 38 and/or within vacuum chamber 20. For example, one or more systems or other components such as a fuel system, a fuel line, piping, valves, heat exchangers, pumps, header tanks, and/or accumulators may be stored in and/or positioned in space 40 and/or vacuum chamber 20.

Disclosed storage tanks 10 (and/or systems 42 including the same, discussed herein) may be used to store and/or transport fuel (e.g., cryogenic fuel), and/or to provide a storage tank that may be integrated with an aircraft. Suitable materials for disclosed storage tanks 10 are understood by those of ordinary skill in the art, though non-limiting examples include aluminum and carbon composite materials. Advantageously, and additionally or alternatively, storage tanks 10 and/or systems 42 may be used to minimize or reduce weight, space, and/or drag of fuel storage systems for aircraft. Fuel volume can be added to aircraft using disclosed storage tanks 10 with minimal drag penalties in some examples. As further advantages, disclosed storage tanks 10 may provide simple structures that can be linked across other parts of aircraft to balance out reaction forces. In some examples, the shape and structure of outer shell 18 may be decoupled from pressure vessel 12. For example, in some examples, outer shell 18 does not touch or contact inner shell 16 except at corner joints (e.g., vertices 32). Systems 42 may include leak detection systems and/or vacuum pumps to address any potential issues within storage tanks 10.

Figure 2:
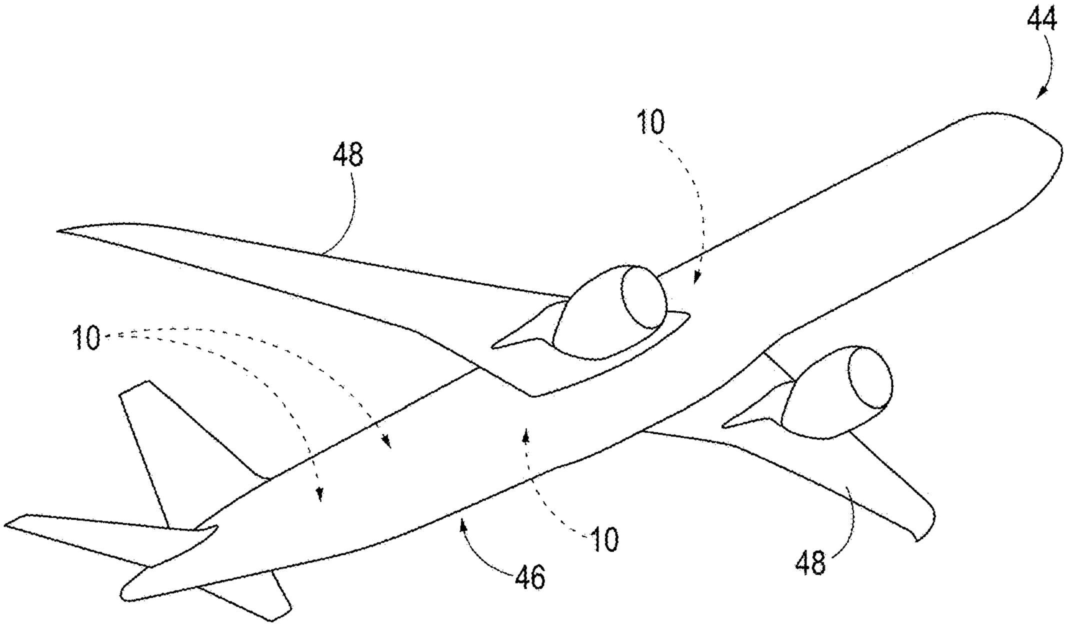
FIG. 2 is a perspective representation of an aircraft with an incorporated multi-walled storage tank according to the present disclosure.

FIGS. 2-9 schematically illustrate examples of systems 42 including one or more storage tanks 10 according to the present disclosure. In various systems 42, one or more multi-walled storage tanks 10 may be positioned within, positioned on, integrated with, and/or coupled to an aircraft 44. For example, FIG. 2 illustrates an example of system 42 in which storage tank 10 is positioned in a wake of a belly fairing 46 of aircraft 44. Storage tanks 10 may be added to aircraft 44 in this manner with minimal increased drag to aircraft 44. Such positioning also may be supplemented by one or more internal storage tanks 10 positioned within aircraft 44. Additionally or alternatively, the positioning shown in FIG. 2 may be further extended aft, and/or may include additional modules ahead of wings 48.

Figure 3:
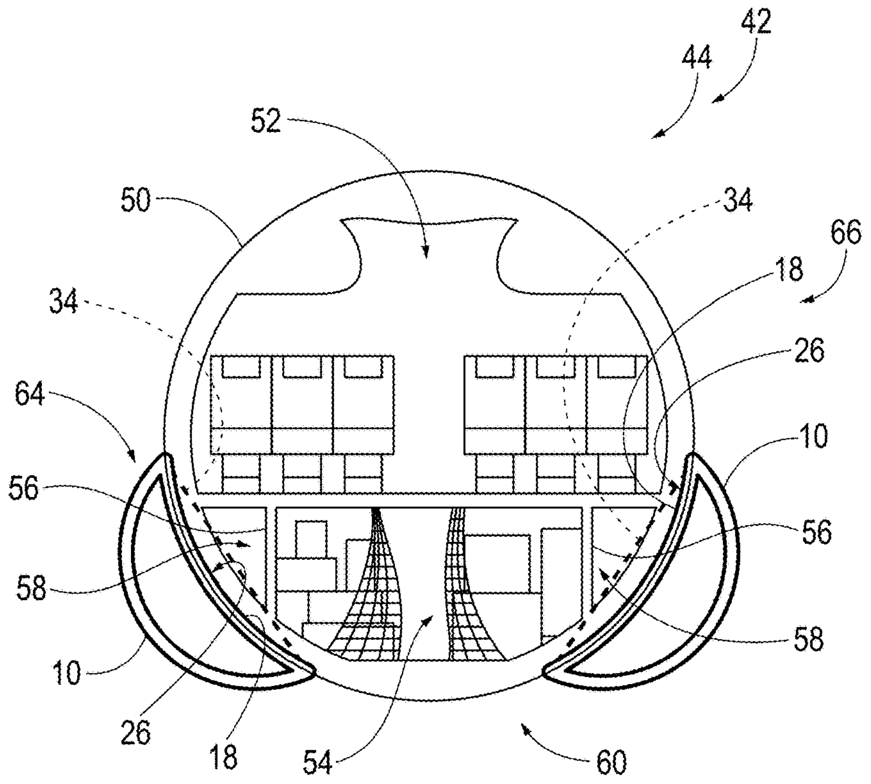
FIG. 3 is a schematic elevation cutaway view of an example of systems including presently disclosed multi-walled storage tanks coupled to an aircraft fuselage.

As shown in FIGS. 3-8, in some examples of systems 42, multi-walled storage tank 10 shares a wall with aircraft 44 (e.g., with a fuselage 50 of aircraft 44). For example, FIG. 3 schematically represents a cross-section of fuselage 50 of aircraft 44, generally including a main cabin 52 and a lower cargo area 54. In this example, two storage tanks 10 are integrated with fuselage 50, with one storage tank 10 being positioned on each side (e.g., the right and left side) of fuselage 50. Concave surfaces 26 of outer shell 18 may have a similar radius (e.g., complementary shape, or contour to) fuselage 50 for smooth integration of storage tanks 10 against fuselage 50. In some examples, dedicated external structures 34 (e.g., external tension members) may extend through a space 58 outboard of stanchions 56 to further support storage tanks 10.

Figure 4:
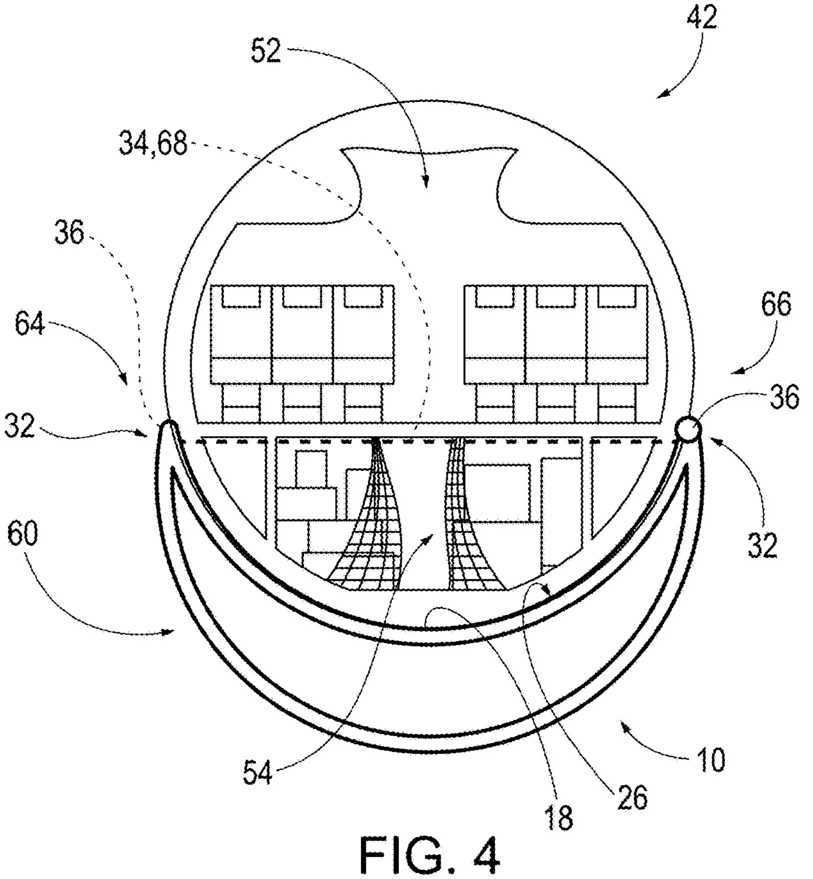
FIG. 4 is a schematic elevation cutaway view of an example of systems including a presently disclosed multi-walled storage tank coupled to a lower side of an aircraft fuselage.
Figure 5:
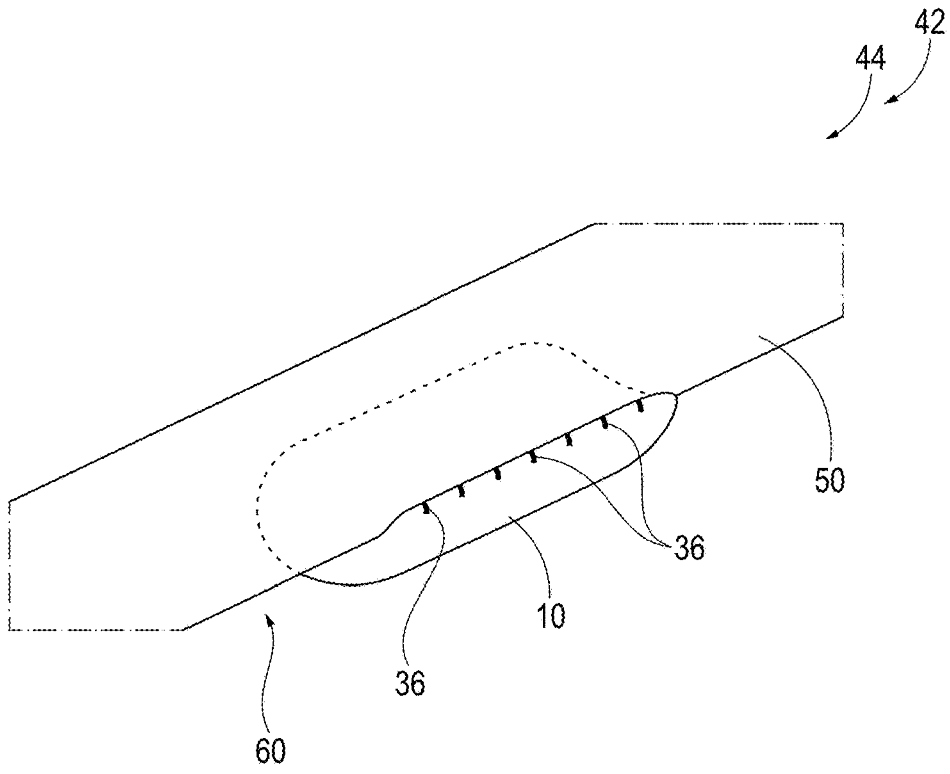
FIG. 5 is a perspective schematic representation of a storage tank of the present disclosure integrated with an aircraft fuselage.

While FIG. 3 shows two spaced apart storage tanks 10 coupled to fuselage 50, FIG. 4 shows an example of system 42 in which a single storage tank 10 is coupled to lower side 60 of fuselage 50, extending from right side 64 to left side 66 of fuselage 50. Similar to the example of FIG. 3, concave surface 26 of outer shell 18 may have a similar radius (e.g., complementary shape or contour) to fuselage 50 for smooth integration of storage tank 10 against fuselage 50. In the example of FIG. 4, a floor 68 of main cabin 52 may function as an external tension member for storage tank 10. Additionally or alternatively, a dedicated external structure 34 may be integrated into floor 68 or positioned above or below floor 68 to provide structural support to storage tank 10. Storage tank 10 in FIG. 4 also includes vertex fittings 36 at each vertex 32 of storage tank 10 to couple storage tank 10 to fuselage 50. FIG. 5 shows another example of system 42 in which storage tank 10 is coupled to lower side 60 of fuselage 50, via a plurality of vertex fittings 36.

Figure 6:
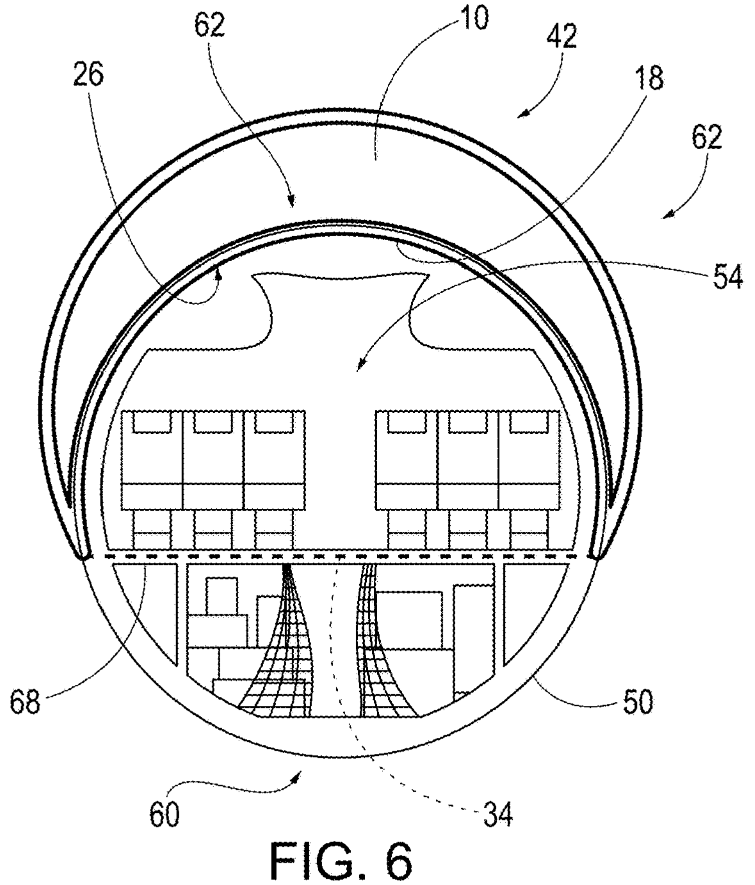
FIG. 6 is a schematic elevation cutaway view of an example of systems including a presently disclosed multi-walled storage tank coupled to an upper side of an aircraft fuselage.
Figure 7:
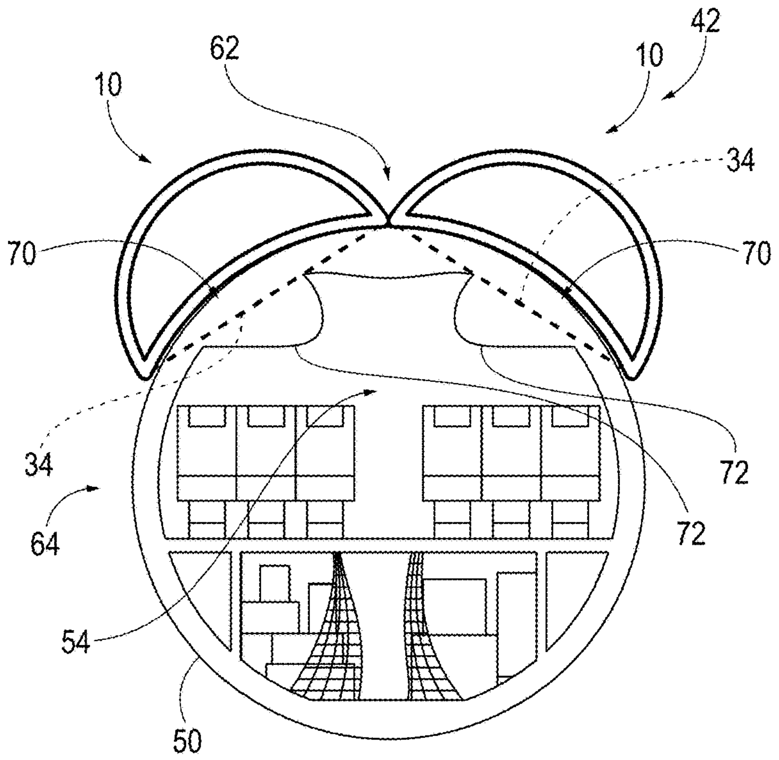
FIG. 7 is a schematic elevation cutaway view of an example of systems including presently disclosed multi-walled storage tanks coupled to an aircraft fuselage.
Figure 8:
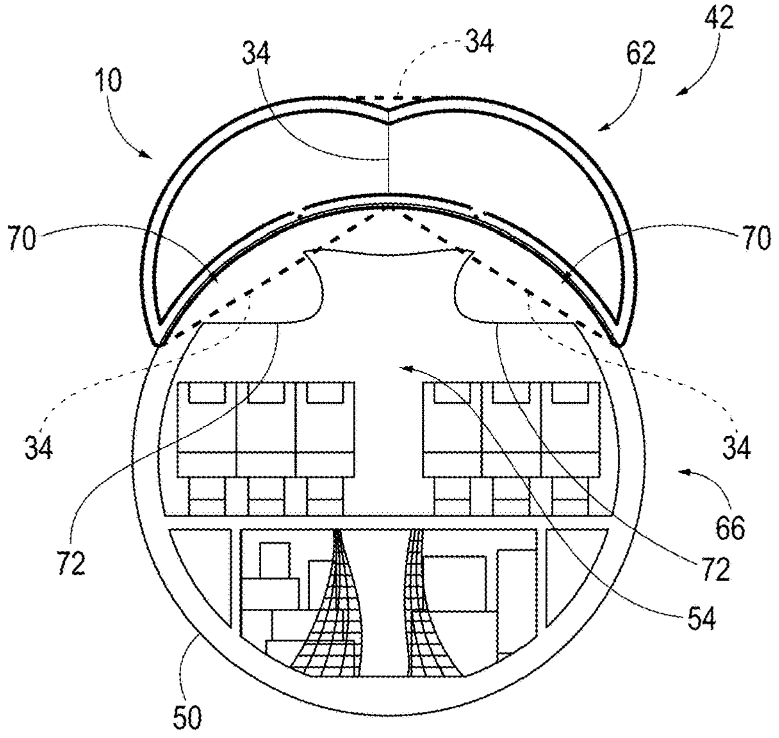
FIG. 8 is a schematic elevation cutaway view of an example of systems including presently disclosed multi-walled storage tanks coupled to an aircraft fuselage.

Multi-walled storage tank 10 may be coupled to a lower side 60 of fuselage 50, such as shown in FIGS. 3-5, and/or to an upper side 62 of fuselage 50, such as shown in FIGS. 6-8. FIG. 6 is similar to the example of FIG. 4, except that storage tank 10 is predominantly positioned on, or across, upper side 62 of fuselage 50, rather than lower side 60 as shown in FIG. 4. The example of FIG. 6 also may utilize floor 68 of main cabin 52 to function as an external tension member for storage tank 10, and/or a dedicated external structure 34 may be integrated into floor 68 or positioned above or below floor 68 to provide structural support to storage tank 10.

FIGS. 7-8 illustrate alternative examples of systems 42 in which two storage tanks 10 (in the example shown in FIG. 7) or a lobed storage tank 10 (in the example shown in FIG. 8) are coupled to upper side 62 of fuselage 50. In these examples, each storage tank 10 has an external tension member (which is an example of dedicated internal and/or external structures 34) extending through a space 70 between overhead bin bays 72 of aircraft 44. These external tension members may be coupled to multi-walled storage tank 10 and configured to support and/or maintain a shape of multi-walled storage tank 10.

Figure 9:
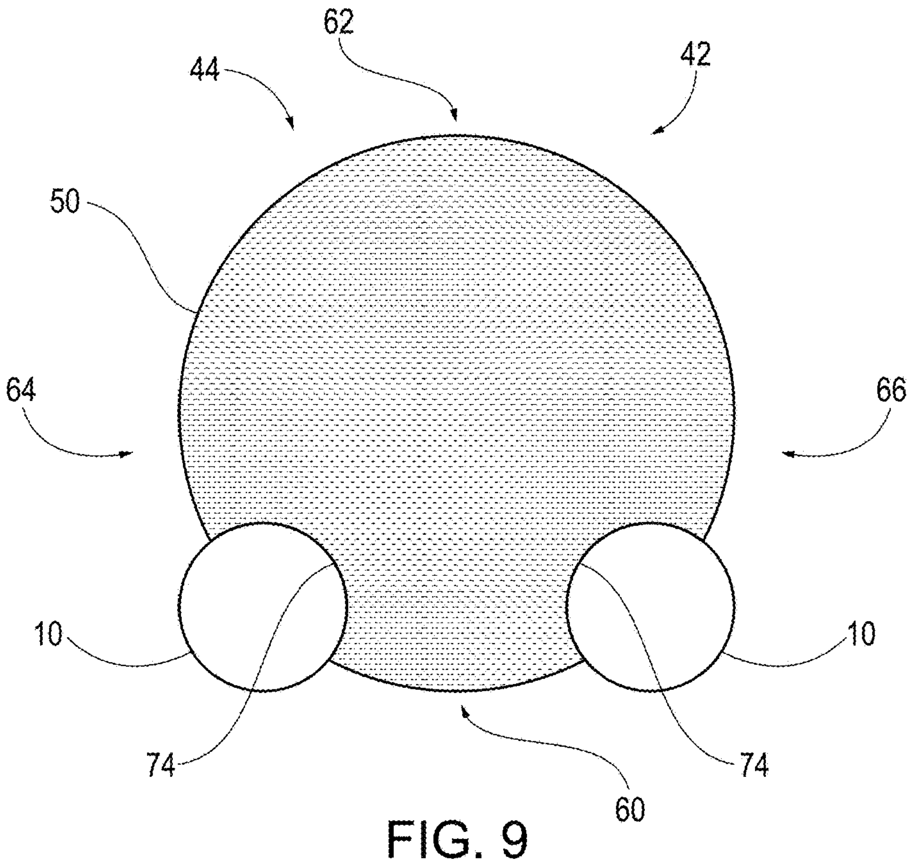
FIG. 9 is a schematic elevation cross-sectional view of an aircraft fuselage with concave surfaces and presently disclosed storage tanks nested within the concavities.
Figure 10:
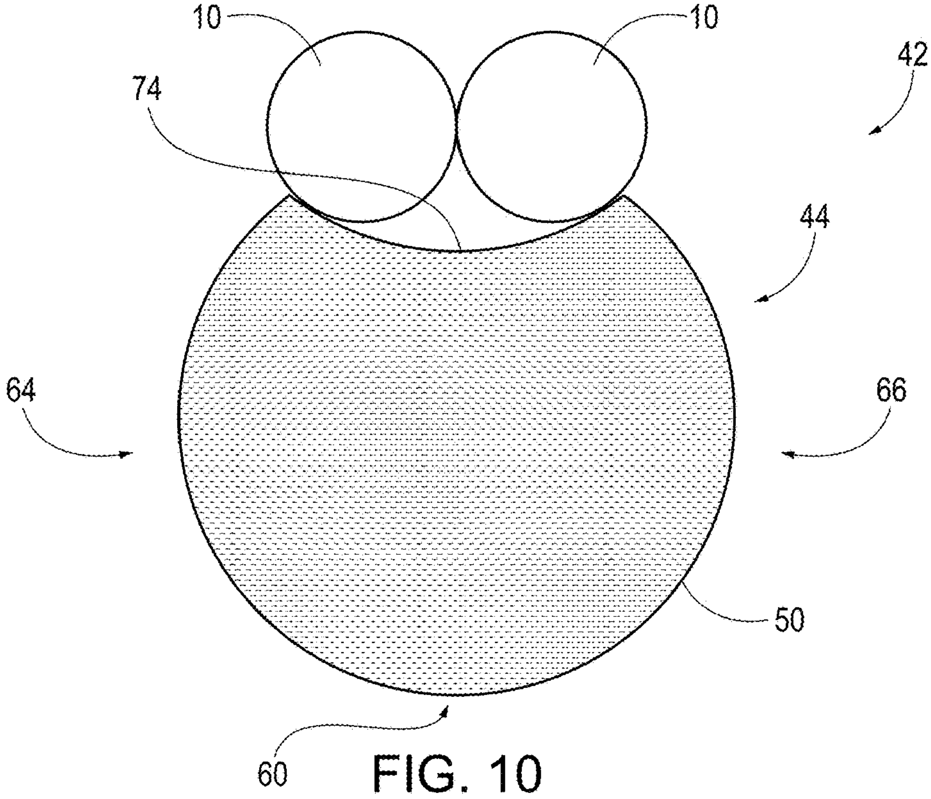
FIG. 10 is a schematic elevation cross-sectional view of an aircraft fuselage with a concave surfaces and presently disclosed storage tanks nested within the concavity.

FIGS. 9-10 schematically illustrate examples of systems 42 in which aircraft 44 includes one or more concave aircraft surfaces 74. One or more storage tanks 10 may be positioned at least partially within the space created by concave aircraft surface 74. For example, the example of system 42 shown in FIG. 9 includes a plurality of concave aircraft surfaces 74, with a respective storage tank 10 nestled into engagement with each respective concave aircraft surface 74. While the example of FIG. 9 shows concave aircraft surfaces 74 formed in lower side 60 of fuselage 50, fuselage 50 additionally or alternatively may include concave aircraft surfaces 74 in upper side 62, right side 64, and/or left side 66 of fuselage 50. The example of system 42 shown in FIG. 10 shows two storage tanks 10 positioned such that part of each storage tank 10 is nested in and against a single concave aircraft surface 74. In the example of FIG. 10, concave aircraft surface 74 is shown formed in upper side 62 of fuselage 50, though in other examples, aircraft 44 additionally or alternatively may include such a concave aircraft surface 74 formed in right side 64, left side 66, and/or lower side 60 of fuselage 50. Thus, the examples of FIGS. 9-10 illustrate examples of systems 42 in which multi-walled storage tank 10 is coupled to aircraft 44 via concave aircraft surface(s) 74. While concave aircraft surfaces 74 are shown as formed in fuselage 50, in other systems 42, concave aircraft surfaces 74 additionally or alternatively may be formed in different components, locations, or structures of aircraft 44. In some examples, conventional (e.g., cylindrical) tanks may be used with such arrangements of aircraft 44 having one or more concave aircraft surfaces 74.

Turning now to FIGS. 11-22, illustrative non-exclusive examples of storage tanks 10 and/or systems 42 are illustrated. Where appropriate, the reference numerals from the schematic illustrations of FIGS. 1-10 are used to designate corresponding parts in FIGS. 11-22; however, the examples of FIGS. 11-22 are non-exclusive and do not limit storage tanks 10 or systems 42 to the illustrated embodiments of FIGS. 11-22. That is, storage tanks 10 and systems 42 are not limited to the specific embodiments of the illustrated FIGS. 11-22 and may incorporate any number of the various aspects, configurations, characteristics, properties, etc. that are illustrated in and discussed with reference to the schematic representations of FIGS. 1-10 and/or the embodiments of FIGS. 11-22, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each of FIGS. 11-22; however, it is within the scope of the present disclosure that the previously discussed features, variants, etc. may be utilized therewith.

Figure 11:
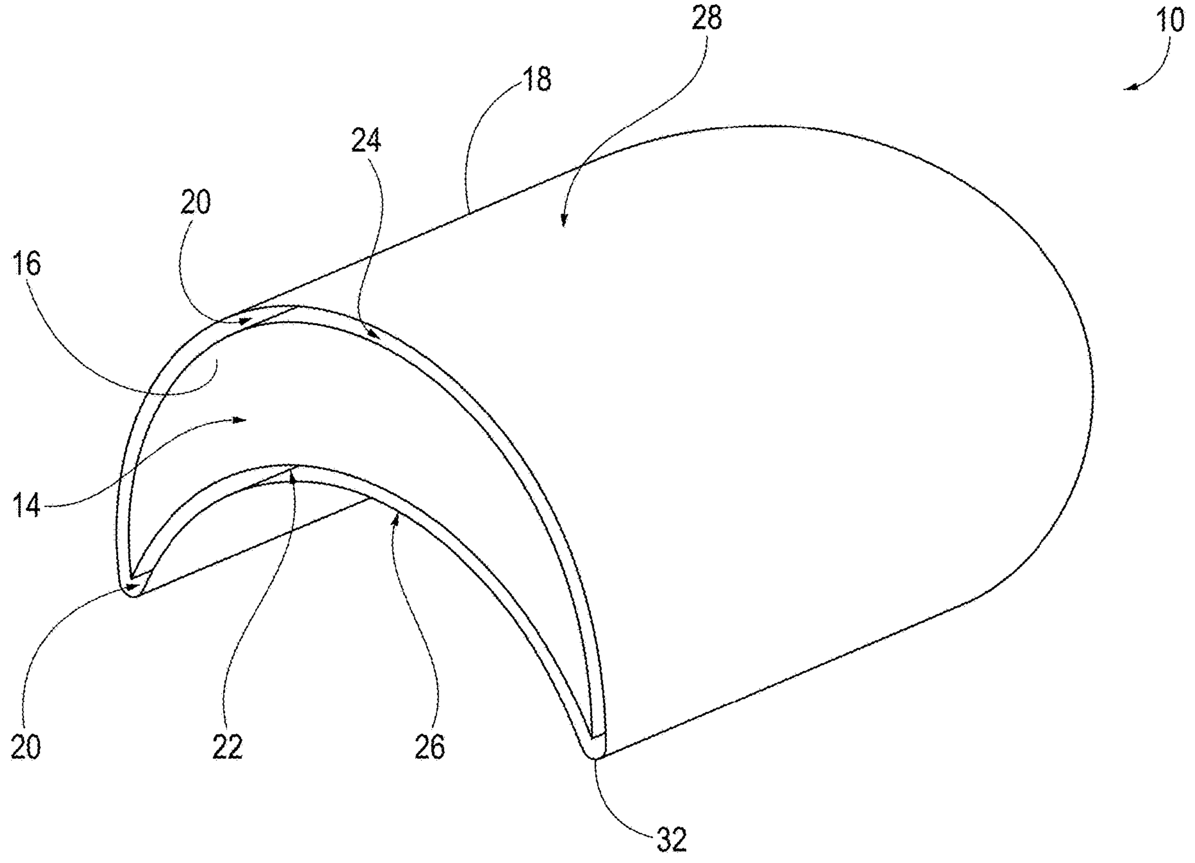
FIG. 11 is a perspective cutaway view of an example of a multi-walled storage tank according to the present disclosure.

FIG. 11 illustrates an example of storage tank 10 having a crescent-shaped cross-sectional area for both pressure vessel 12 and outer shell 18. In this example, inner shell 16 has concave surface 22, and outer shell 18 has a complementary concave surface 26. Similarly, inner shell 16 has a convex surface 24, and outer shell 18 has a complementary convex surface 28. Concave surfaces 22, 26 meet convex surfaces 24, 28 at vertices 32.

Figure 12:
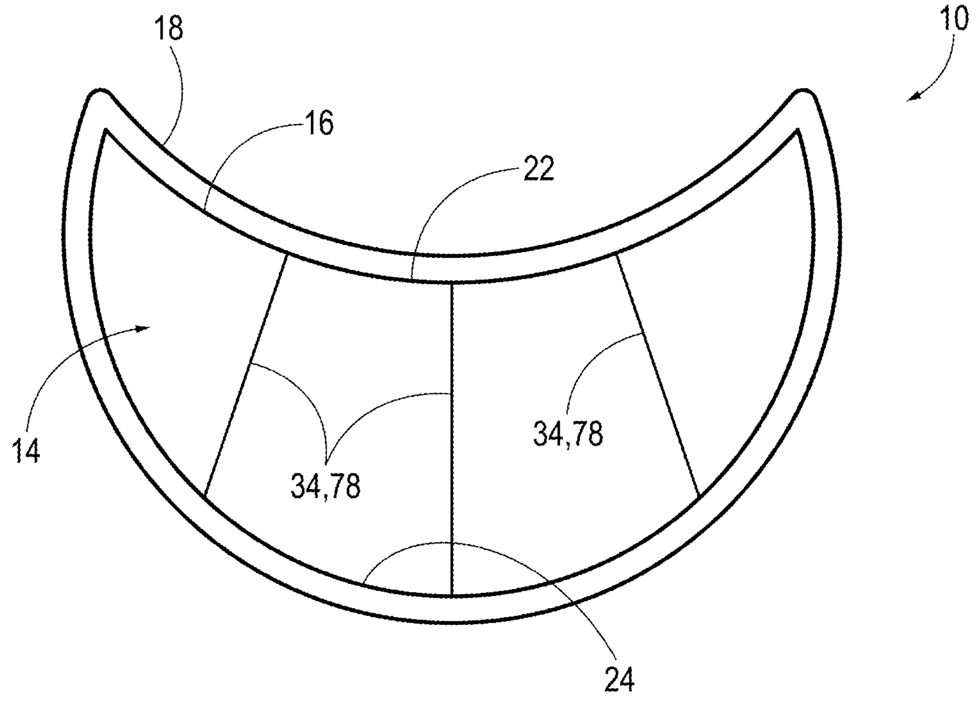
FIG. 12 is an elevation cross-sectional view of an example of a multi-walled storage tank according to the present disclosure, having internal struts.

FIG. 12 illustrates an example of storage tank 10 having a plurality of internal struts 78 extending from concave surface 22 of inner shell 16 to convex surface 24 of inner shell 16. Internal struts 78 are substantially perpendicular to concave surface 22 within inner volume 14, in some examples.

Figure 13:
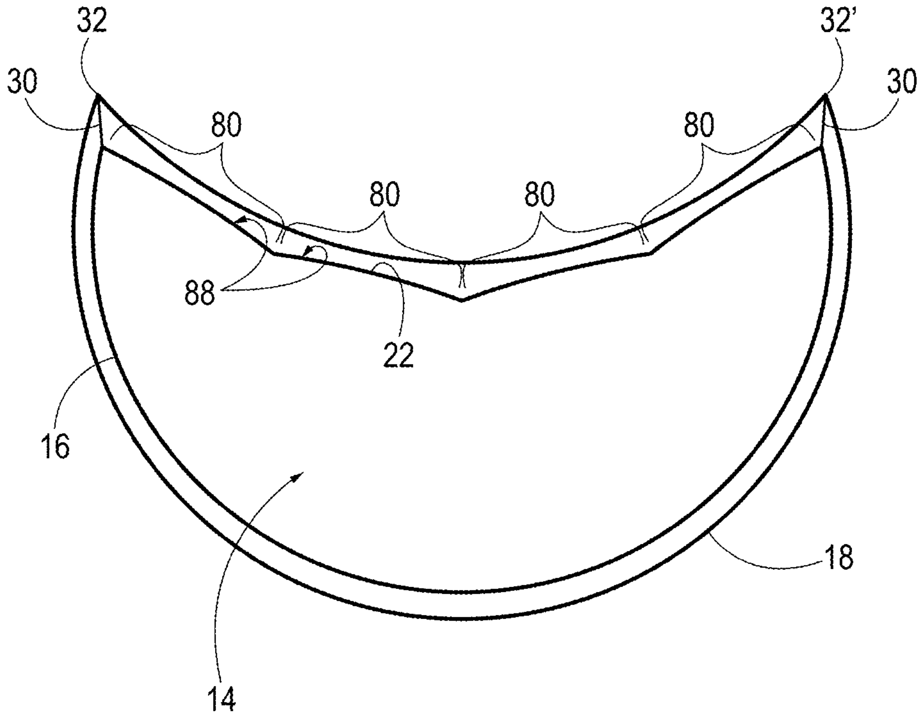
FIG. 13 is an example of a multi-walled storage tank according to the present disclosure, having a lobed inner shell.

FIG. 13 illustrates an example of storage tank 10 in which inner shell 16 is lobed. Specifically, while concave surface 22 is globally concave between vertices 32, 32', it is locally convex at areas indicated at 80, forming a plurality of lobes 88 along at least one surface (e.g., concave surface 22) of inner shell 16.

Figure 14:
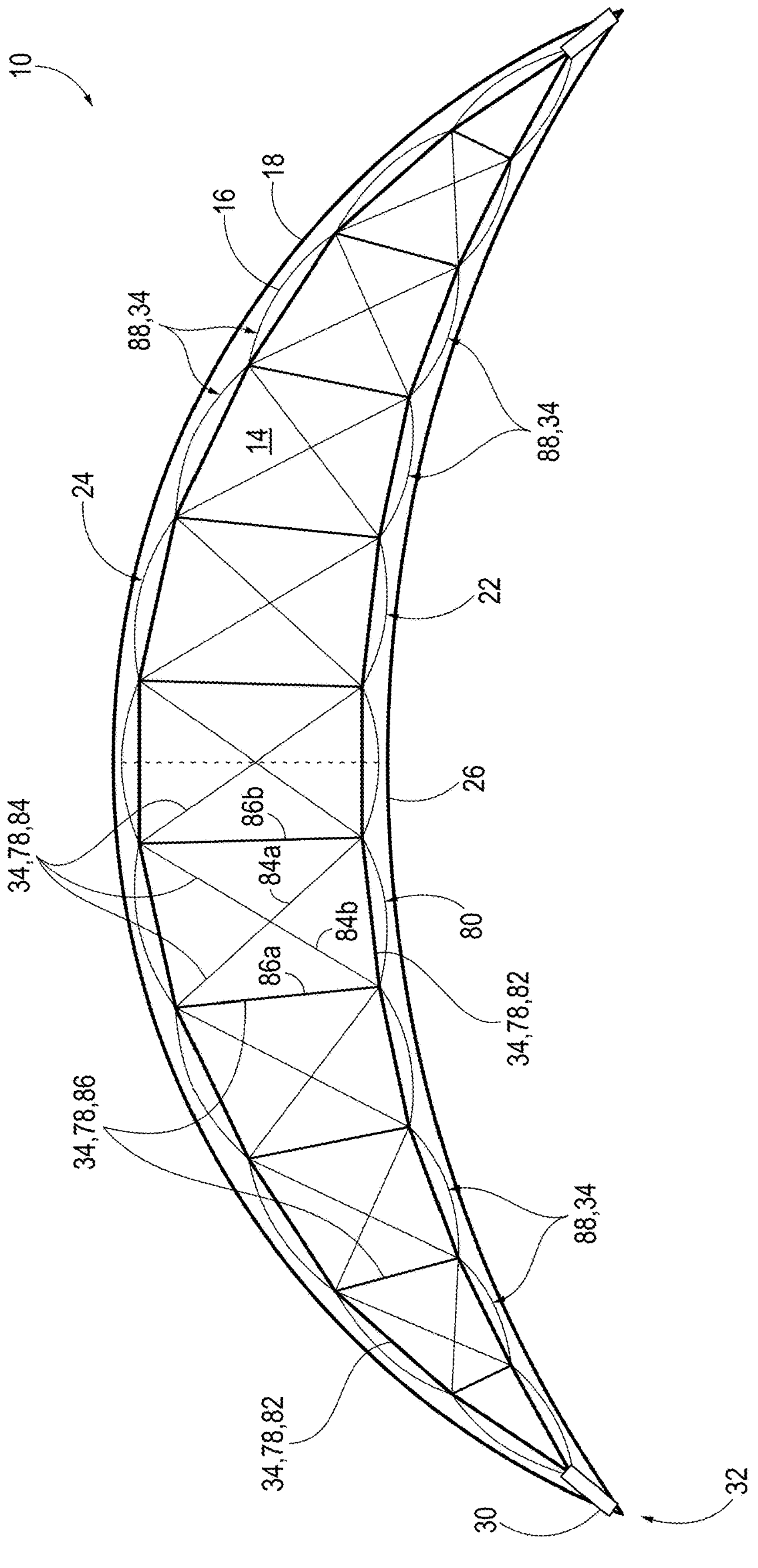
FIG. 14 is an example of a multi-walled storage tank according to the present disclosure, having a plurality of different types of internal struts.

FIG. 14 illustrates an example of storage tank 10 having a plurality of dedicated internal structures 34 in the form of internal struts 78. Various examples of internal struts 78 may be formed by, for example, cables or perforated webs. Internal struts 78 may include radial members 86 (also referred to herein as vertical struts 86), chords 82 (also referred to herein as horizontal struts 82), and cross-braces 84. Specifically, a first portion of the plurality of internal struts 78 form vertical struts, or radial members, 86 that extend substantially perpendicularly to concave surface 22 and convex surface 24 of inner shell 16. Concave surface 22 of inner shell 16 is globally concave while having locally convex portions 80 between adjacent internal struts 78. This configuration may allow for the skin of inner shell 16 to be in tension and not susceptible to buckling. A second portion of the plurality of internal struts 78 are configured as cross-braces 84 that extend from concave surface 22 to convex surface 24 of inner shell 16 at a non-perpendicular angle. Generally, each cross-brace 84 extends from one vertical strut 86 to an adjacent vertical strut. For example, cross-braces **84*a* and 84*b* each extend from vertical strut 86*a* to vertical strut 86*b*, with cross-braces 84*a*, 84*b* crossing each other within inner volume 14. Each adjacent pair of vertical struts 86 has two cross-braces 84 connecting the pair of vertical struts 86 in this example, though in other examples, more or fewer cross-braces 84 may be included. Cross-braces 84 may be configured to withstand inertial loads from fuel within storage tank 10 due to acceleration created by flight loads. Chords 82 extend between adjacent vertical struts 86**.

The example of FIG. 14 also includes lobes 88 formed in both concave surface 22 and convex surface 24. Lobes 88 may serve as dedicated external and/or internal structures 34 and coincide with locally convex portions 80 along concave surface 22 in this example. Lobes 88 may be designed to form under load or may be pre-formed in inner shell 16 of the pressure vessel 12. In some examples, lobes 88 are present in the skin of inner shell 16 in an unloaded condition (e.g., when pressure vessel is unpressurized), though there may be little or no stress in the skin. Under pressure, lobes 88 may expand slightly. In some examples, lobes 88 may be separated from one another via internal struts 78, while in some examples, lobes 88 are simply scallops formed in the profile of pressure vessel 12. Some examples of storage tank 10 include baffles within inner volume 14 to reduce or prevent sloshing, and/or perforated webs may be used both to reduce sloshing and form lobes 88. In some examples, lobes 88 may define separate portions of inner volume 14, which may be separated by sheets of material that may be configured to function as pressure membranes if the adjacent lobe springs a leak.

Figure 15:
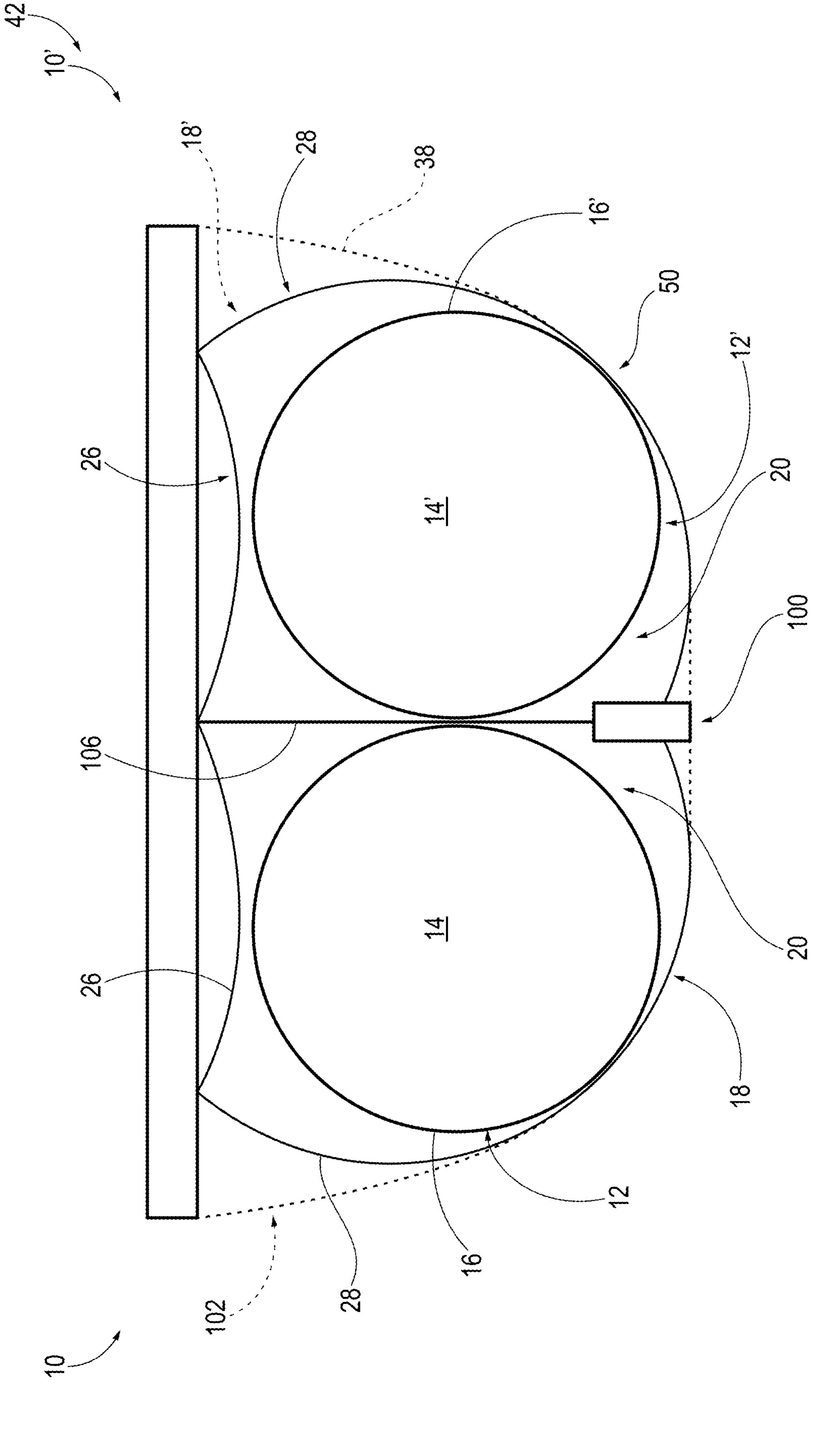
FIG. 15 is an example of a multi-walled storage tank according to the present disclosure, having an outer shell with concave and convex surfaces.
Figure 16:
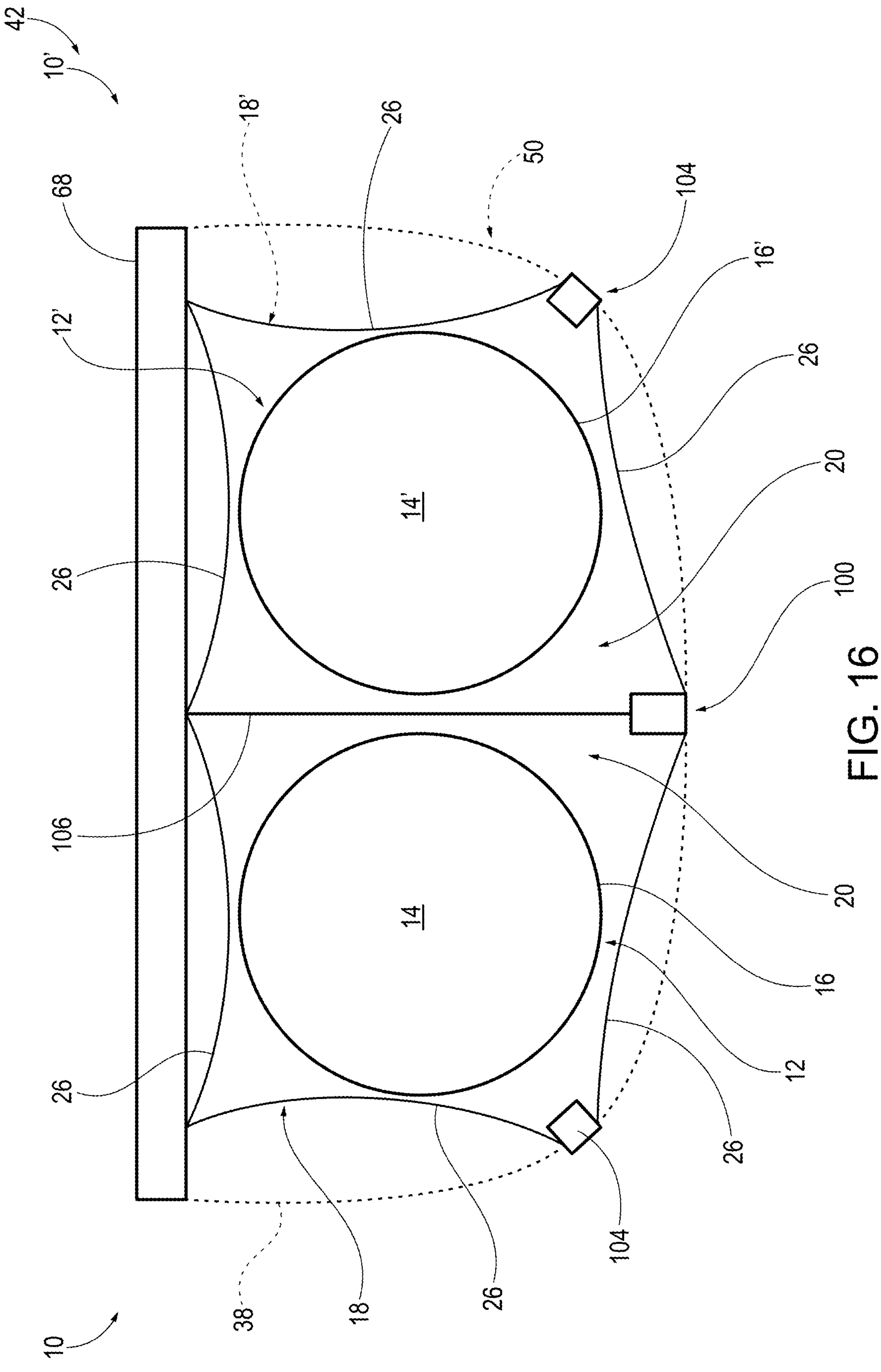
FIG. 16 is an example of a multi-walled storage tank according to the present disclosure, having an outer shell with a plurality of concave surfaces.

FIGS. 15-21 illustrate a variety of examples of storage tank 10 in which inner shell 16 has a circular or round cross-sectional shape. In FIGS. 15-16, a portion of fuselage 50 below floor 68 of the main cabin of an aircraft is shown in cross-section. As shown in the example of FIG. 15, outer shell 18 may have at least one concave surface 26 and at least one convex surface 28. In some examples, an aero fairing 102 (or outer shape of fuselage 50) may serve as a container 38 and/or may otherwise surround outer shell 18, which may be a single outer shell 18 or may be two different outer shells 18, 18'. Concave surfaces 26 of outer shell 18 may be in tension, while convex surfaces 28 of outer shell 18 may be in compression. Some examples include a keel beam 100 positioned between adjacent multi-walled storage tanks 10, 10' and/or one or more stringers 104 integrated with or positioned within outer shell(s) 18 and/or 18' (FIG. 16). Stringers 104 may be positioned at an intersection of two concave surfaces 26 of outer shell 18, as shown in FIG. 16. Keel beam 100 and/or stringers 104 generally extend along the length of fuselage 50 and are supported at their ends by a frame or bulkhead, as is understood in the art. In this manner, keel beam 100 and/or stringers 104 may be able to have elements of presently disclosed storage tanks 10 mounted to and/or supported by them. As shown in the example of FIG. 16, outer shell 18 may have a plurality of concave surfaces 26. As shown in both FIGS. 15 and 16, respective outer shells 18, 18' of adjacent multi-walled storage tanks 10, 10' may be coupled together, have a shared wall 106, and/or abut one another.

The examples of FIGS. 15-16 (among others) include two pressure vessels 12 (e.g., first pressure vessel 12 and second pressure vessel 12') each having an inner shell (e.g., first inner shell 16 and second inner shell 16') surrounding an inner volume (e.g., first inner volume and second inner volume 14') and an outer shell (e.g., first outer shell 18 and second outer shell 18') surrounding the inner shell. In the example of FIG. 16, concave surfaces 26 of outer shell 18 are in tension, while surrounding structures such as floor 68, keel beam 100, and/or frames of fuselage 50 carry the circumferential compression.

Figure 17:
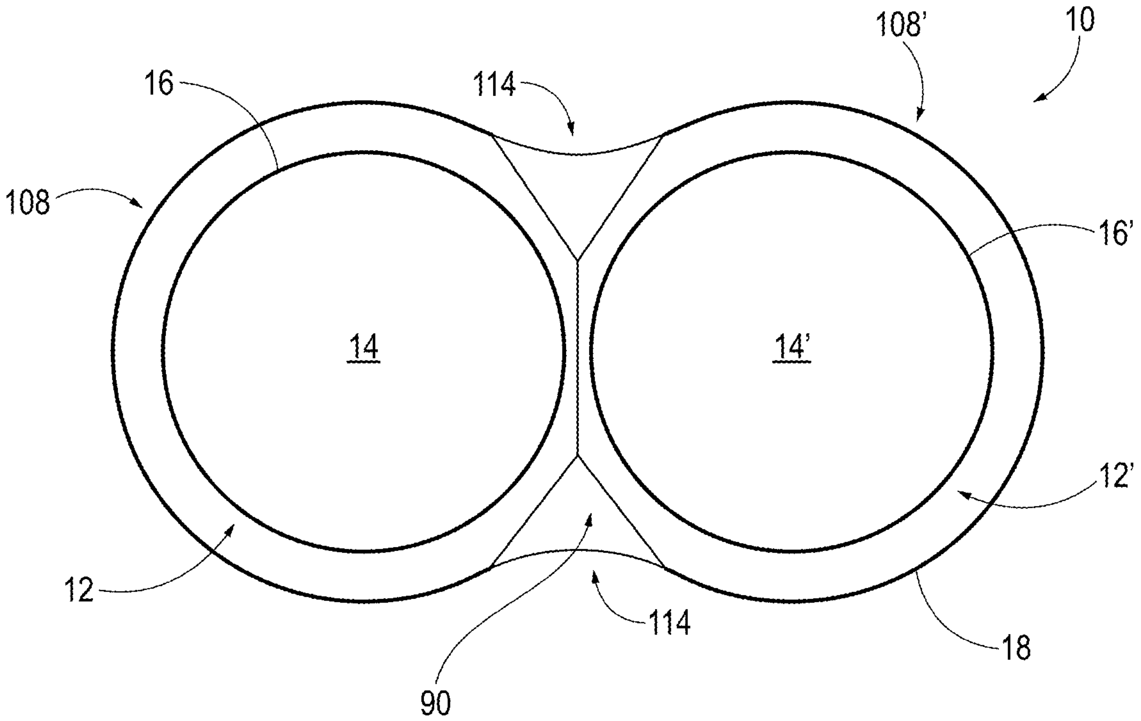
FIG. 17 is an example of a multi-walled storage tank according to the present disclosure, having a lobed outer shell surrounding two inner shells.
Figure 18:
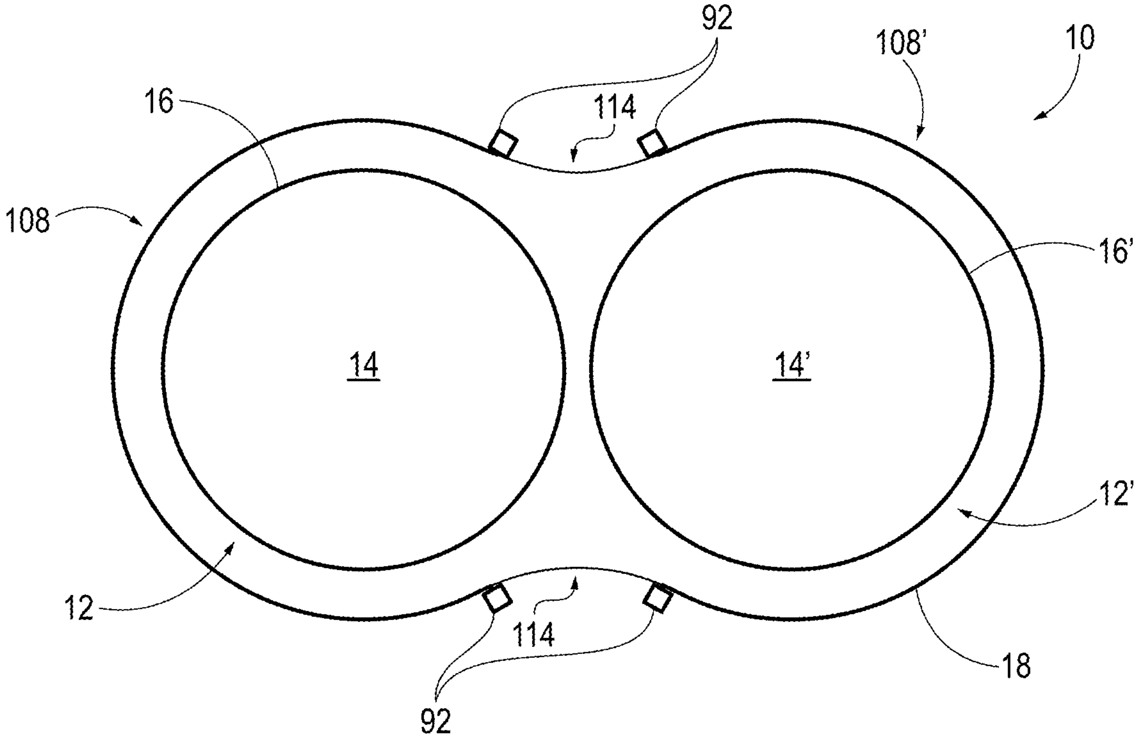
FIG. 18 is an example of a multi-walled storage tank according to the present disclosure, having a lobed inner shell surrounding two inner shells.

FIGS. 17-18 illustrate examples of storage tank 10 in which two (or more) inner shells 16, 16' are surrounded by a common outer shell 18. In other words, outer shell 18 surrounds both first pressure vessel 12 and second pressure vessel 12' in the examples of FIGS. 17-18. Outer shell 18 is lobed in these examples—each of these examples of outer shell 18 includes two lobes 108, 108' though other examples of storage tank 10 may include outer shells 18 with more lobes 108. As shown in FIG. 17, storage tank 10 may include an internal truss of two-force members 90 separating first pressure vessel 12 from second pressure vessel 12'. Internal truss of two-force members 90 may be coupled to outer shell 18 on either side of first pressure vessel 12 and second pressure vessel 12'. In the example of FIG. 17, circumferential compression is carried by lobes 108, and the central portions 114 where the curvature is reversed experience compression. To counteract the crushing effect of these compressive forces in the vertical direction in FIG. 17, internal trusses 90 may be configured to function as a compression brace (e.g., similar to a tent pole) that resists compression between central portion 114. The Y-shape of internal trusses 114 may be configured to resist the compressive loads put on internal trusses 114 by outer shell 18. As shown in FIG. 18, outer shell 18 may include a plurality of end-supported beam stiffeners 92 configured to resist compressive loads experienced by central portions 114 of outer shell 18. Stiffeners 92 may be supported at their ends, such as by bulkheads of the aircraft.

Figure 19:
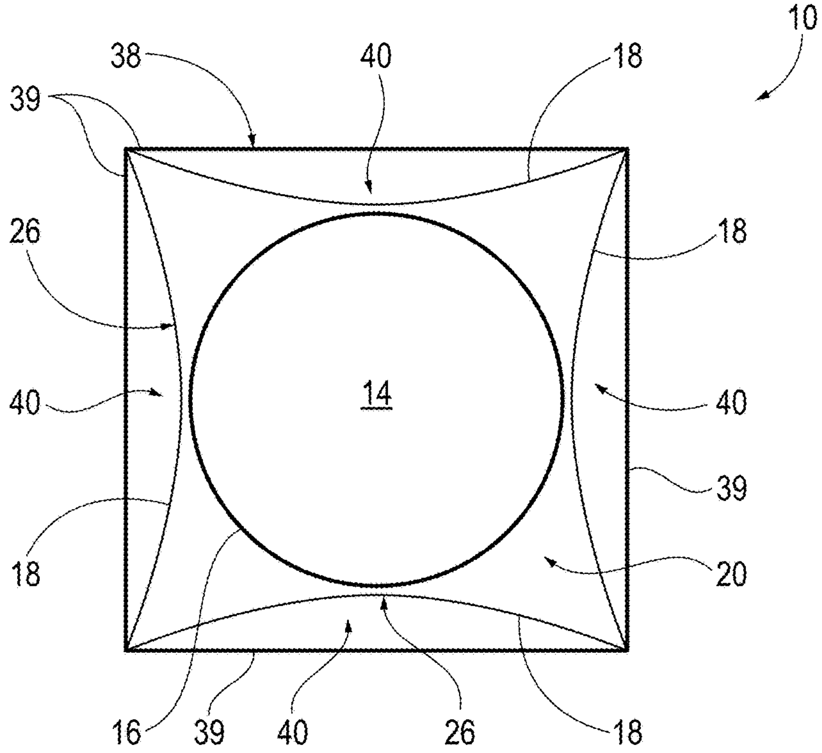
FIG. 19 is an example of a multi-walled storage tank according to the present disclosure, having a square shaped container surrounding the outer shell.
Figure 20:
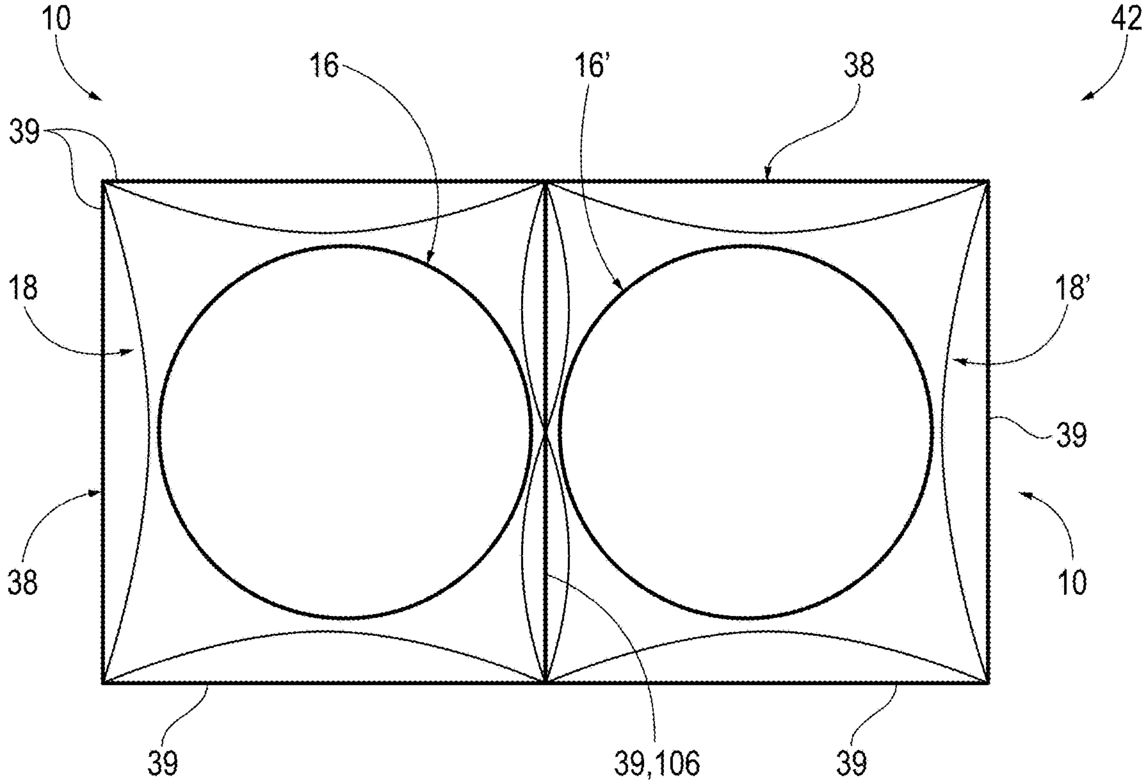
FIG. 20 is an example of a modular system of two multi-walled storage tanks according to the present disclosure.

FIGS. 19-20 illustrate examples of storage tanks 10 or systems 42 of storage tanks 10 in which a square cross-section container 38 having a plurality of walls 39 surrounds outer shell 18. In FIG. 20, containers 38 may be joined together to more efficiently use the available space. Walls 39 of container(s) 38 may be configured to carry compression loads that result from the ambient pressure acting on the outer shell 18. Walls 39 need not be solid, because they do not need to establish a barrier between the ambient pressure and vacuum chamber 20 inside the outer shell 18. However, walls 39 generally will be designed to withstand buckling from the compressive loads. The design of the wall structure has many options, which can be achieved by one of ordinary skill in the art. While FIGS. 17, 18, and 20 illustrate examples having two lobes 108 and two abutting containers 38, other examples of storage tanks 10 and systems 42 may include expanded versions have more lobes 108 and/or additional joined container modules 38.

Figure 21:
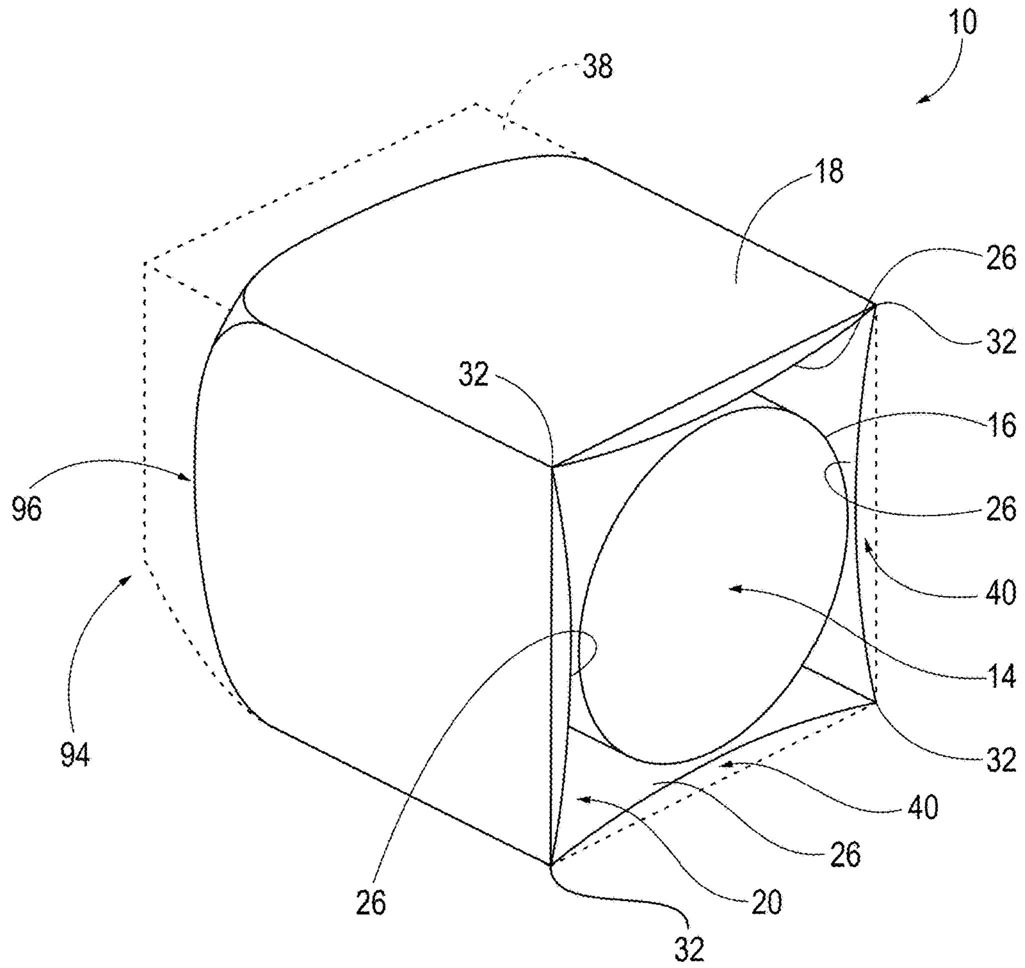
FIG. 21 is an example of a multi-walled storage tank according to the present disclosure, having a domed end cap.
Figure 22:
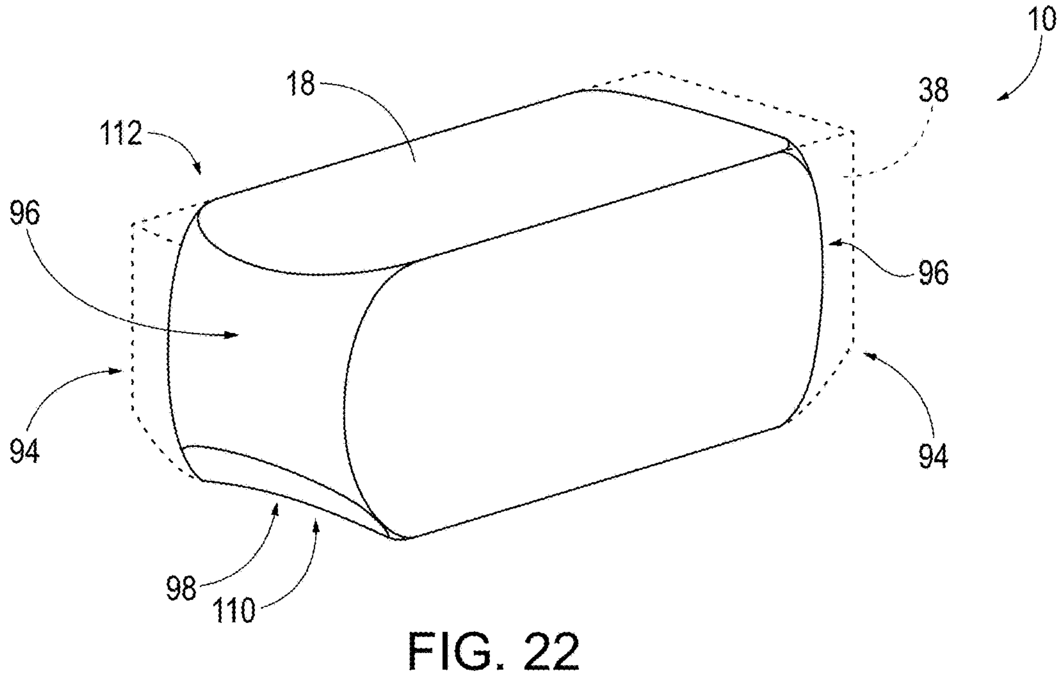
FIG. 22 is an example of a multi-walled storage tank according to the present disclosure, having a domed end cap.

FIGS. 21 and 22 illustrate examples of storage tank 10 with a container 38 surrounding outer shell 18 to support concave surfaces 26 of outer shell 18. Container 38 may be tapered at one or both ends 94, as shown in FIGS. 21-22. In some examples, outer shell 18 includes a domed end cap 96 and/or a concave dome chamfer 98 (FIG. 22). Domed end cap 96 and/or concave dome chamfer 98 may be configured to conform to the shape or profile of container 38 surrounding outer shell 18, may provide better volumetric fuel capacity for storage tank 10, and/or may allow storage tank 10 to fit into a rectilinear volume more easily. In some examples, concave dome chamfer 98 is only included on a lower edge 110, but not an upper edge 112, of storage tank 10. Volumes within vacuum chamber 20 and/or space 40 between container 38 and outer shell 18 may be utilized to store additional systems or aircraft components as discussed herein. Container 38 may be configured to support concave surface 26 of outer shell 18 at corners (e.g., vertices 32) and/or along their edges. In some examples, container 38 is a vent manifold configured to vent to atmosphere to provide a failsafe configured to prevent any combustible mixture from ever arising in the aircraft cabin. In some examples, container 38 and outer shell 18 can be the same structure. This arrangement may be advantageous because it allows container 38 to perform multiple functions, such as providing a convenient way to handle storage tank 10, and carrying compression loads from the ambient pressure acting on outer shell 18.

Figure 23:
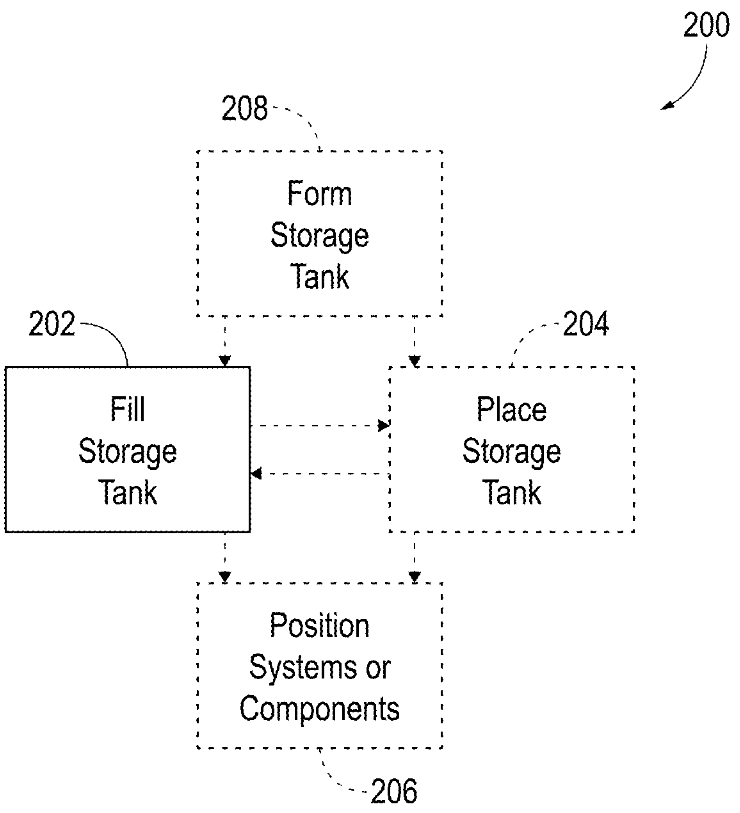
FIG. 23 is a schematic flowchart representation of methods according to the present disclosure.

FIG. 23 schematically provides a flowchart that represents illustrative, non-exclusive examples of methods 200 according to the present disclosure. In FIG. 23, some steps are illustrated in dashed boxes indicating that such steps may be optional or may correspond to an optional version of method 200 according to the present disclosure. That said, not all methods 200 according to the present disclosure are required to include the steps illustrated in solid boxes. The methods 200 and steps illustrated in FIG. 23 are not limiting and other methods and steps are within the scope of the present disclosure, including methods having greater than or fewer than the number of steps illustrated, as understood from the discussions herein.

Methods 200 generally include filling a multi-walled storage tank (e.g., storage tank 10) with fuel (e.g., a cryogenic fuel), fluid, and/or gas, at 202. Methods 200 may include placing the multi-walled storage tank in or on an aircraft (e.g., aircraft 44), at 204. Storage tanks according to the present disclosure may be configured to be easily loaded onto the aircraft, and may serve as an auxiliary fuel tank to increase the range of the aircraft. In some examples, quick-connect and quick-disconnect fuel connections may be utilized with storage tanks 10 placed in or on aircraft. Placing the multi-walled storage tank at 204 may include placing the multi-walled storage tank within an inner volume of the aircraft (e.g., within the aircraft fuselage, such as in a cargo area), integrating the multi-walled storage tank into the aircraft, and/or coupling the multi-walled storage tank to the aircraft. For example, coupling the multi-walled storage tank to the aircraft as part of placing the multi-walled storage tank at 204 may include securing a plurality of vertex fittings (e.g., vertex fittings 36) to the multi-walled storage tank and coupling the multi-walled storage tank to an aircraft structure via the plurality of vertex fittings. Multi-walled storage tanks may be placed at 204 before or after being filled at 202. In other words, multi-walled storage tanks may be full when they are placed in or on the aircraft at 204, or multi-walled storage tanks may be partially or totally empty when they are placed in or on the aircraft at 204. In some methods 200, placing the multi-walled storage tank at 204 includes integrating and/or nesting the outer shell with one or more aircraft structures (e.g., with a fuselage such as fuselage 50). Additionally or alternatively, placing the multi-walled storage tank at 204 may include positioning the multi-walled storage tank within a container (e.g., container 38), such that the container surrounds the outer shell.

Some methods 200 include extending, positioning, placing, and/or storing one or more aircraft systems or components through or in a vacuum chamber (e.g., vacuum chamber 20) of the multi-walled storage tank, and/or through or in a space between the outer shell and a container surrounding the outer shell (e.g., space 40 between container 38 and outer shell 18), at 206.

Additionally or alternatively, methods 200 may include forming one or more multi-walled storage tanks according to the present disclosure, at 208. Forming the multi-walled storage tank(s) at 208 may include coupling the inner shell and the outer shell together via one or more structural couplings (e.g., structural couplings 30) and/or adding at least one dedicated external and/or internal structure (e.g., dedicated internal and/or external structure 34) configured to counteract one or more deforming forces acting on the multi-walled storage tank. Additionally or alternatively, forming one or more multi-walled storage tanks at 208 may include creating a modular system of multi-walled storage tanks by joining, coupling, and/or stacking a plurality of containers, wherein each respective container of the plurality of containers is configured to receive and/or support a respective multi-walled storage tank.

Illustrative, non-exclusive examples of inventive subject matter according to the present disclosure are described in the following enumerated paragraphs:

A1. A multi-walled storage tank (10), comprising:

a pressure vessel (12) comprising an inner volume (14) surrounded by an inner shell (16);

an outer shell (18) surrounding the inner shell (16); and a vacuum chamber (20) between inner shell (16) and outer shell (18).

A1.1. The multi-walled storage tank (10) of paragraph A1, wherein the inner shell (16) comprises at least one concave surface (22).

A1.2. The multi-walled storage tank (10) of paragraph A1, wherein the inner shell (16) comprises at least one surface that is globally concave and/or locally concave.

A1.3. The multi-walled storage tank (10) of any of paragraphs A1-A1.2, wherein the inner shell (16) comprises at least one convex surface (24).

A2. The multi-walled storage tank (10) of any of paragraphs A1-A1.3, wherein the outer shell (18) comprises at least one concave surface (26).

A2.1. The multi-walled storage tank (10) of any of paragraphs A1-A2, wherein the outer shell (18) comprises at least one surface that is globally concave and/or locally concave.

A2.2. The multi-walled storage tank (10) of any of paragraphs A1-A2.1, wherein the outer shell (18) comprises at least one convex surface (28).

A3. The multi-walled storage tank (10) of any of paragraphs A1-A2.1, comprising at least one structural coupling (30) between the inner shell (16) and the outer shell (18).

A4. The multi-walled storage tank (10) of paragraph A3, wherein the at least one structural coupling (30) comprises a plurality of structural couplings (30) located at a number of locations.

A5. The multi-walled storage tank (10) of any of paragraphs A3-A4, wherein the at least one structural coupling (30) is configured to partially or fully cancel out deforming forces experienced by the multi-walled storage tank (10).

A6 The multi-walled storage tank (10) of any of paragraphs A3-A5, wherein the at least one structural coupling (30) comprises coupling at one or more vertices (32) of the multi-walled storage tank (10), at least one structural coupling (30) being configured to balance inner tank flattening forces from internal pressure with outer tank curling forces from atmospheric pressure.

A7. The multi-walled storage tank (10) of any of paragraphs A1-A6, wherein the multi-walled storage tank (10) has a crescent shaped cross-sectional area.

A8. The multi-walled storage tank (10) of any of paragraphs A1-A7, wherein the pressure vessel (12) of the multi-walled storage tank (10) has a crescent shaped cross-sectional area.

A9. The multi-walled storage tank (10) of any of paragraphs A1-A8, comprising at least one dedicated external and/or internal structure (34) configured to counteract one or more deforming forces acting on the multi-walled storage tank (10).

A10. The multi-walled storage tank (10) of paragraph A9, wherein the at least one dedicated external and/or internal structure (34) comprises an external tension member (76) extending between a first vertex (32) and a second vertex (32') of the outer shell (18).

A10.1. The multi-walled storage tank (10) of paragraph A10, wherein the external tension member (76) is configured to exert tension outwardly, such that the external tension member (76) is configured to prevent the first vertex (32) and the second vertex (32') from moving towards each other, or to reduce an extent to which the first vertex (32) and the second vertex (32') move towards each other.

A10.2. The multi-walled storage tank (10) of paragraph A10, wherein the external tension member (76) is configured to exert tension inwardly, such that the external tension member (76) is configured to prevent or limit the first vertex (32) and the second vertex (32') from being pushed apart from each other due to internal pressure within the inner volume (14) of the pressure vessel (12).

A10.3. The multi-walled storage tank (10) of paragraph A10.2, wherein the external tension member (76) is configured to cancel out net flattening forces acting on the multi-walled storage tank (10).

A10.4. The multi-walled storage tank (10) of any of paragraphs A10-A10.2, wherein the external tension member (76) is configured to facilitate integration with one or more aircraft structures.

A11. The multi-walled storage tank (10) of any of paragraphs A9-A10.4, wherein the at least one dedicated external and/or internal structure (34) comprises one or more internal struts (78), wherein each internal strut (78) of the one or more internal struts (78) extends within the inner volume (14) of the pressure vessel (12).

A11.1. The multi-walled storage tank (10) of paragraph A11, wherein each internal strut (78) of the one or more internal struts (78) extends from an/the at least one concave surface (22) of the inner shell (16) to a second surface opposite the at least one concave surface (22).

A11.2. The multi-walled storage tank (10) of paragraph A11 or A11.1, wherein the one or more internal struts (78) are configured to exert tension pulling the at least one concave surface (22) of the inner shell (16) towards the second surface.

A11.3. The multi-walled storage tank (10) of any of paragraphs A11-A11.2, wherein each internal strut (78) of the one or more internal struts (78) comprises a cable.

A11.4. The multi-walled storage tank (10) of any of paragraphs A11-A11.3, wherein each internal strut (78) of the one or more internal struts (78) is configured to mitigate flattening of the multi-walled storage tank (10).

A11.5. The multi-walled storage tank (10) of any of paragraphs A11-A11.4, wherein the one or more internal struts (78) comprises a plurality of internal struts (78), wherein a first portion of the plurality of internal struts (78) form vertical struts (86) that extend substantially perpendicularly to the at least one concave surface (22) of the inner shell (16) and the second surface.

A11.6. The multi-walled storage tank (10) of paragraph A11.5, wherein a second portion of the plurality of internal struts (78) are configured as cross-braces (84) that extend from the at least one concave surface (22) of the inner shell (16) to the second surface at a non-perpendicular angle.

A11.7. The multi-walled storage tank (10) of paragraph A11.6, wherein each cross-brace (84) crosses another respective cross-brace (84), such that each adjacent pair of internal struts (78) of the first portion of the plurality of internal struts (78) has two cross-braces (84) connecting the pair of internal struts (78).

A11.8. The multi-walled storage tank (10) of any of paragraphs A11-A11.7, wherein the one or more internal struts (78) comprises a plurality of horizontal struts (82) and a plurality of vertical struts (86), and wherein each horizontal strut (82) of the plurality of horizontal struts (82) extends from a first vertical strut (86) of the plurality of vertical struts (86) to a second vertical strut (86') of the plurality of vertical struts (86).

A12. The multi-walled storage tank (10) of any of paragraphs A9-A11.8, wherein the at least one dedicated external and/or internal structure (34) comprises one or more lobes (88) formed in the inner shell (16) of the pressure vessel (12).

A12.1. The multi-walled storage tank (10) of paragraph A12, wherein the one or more lobes (88) are designed to form under load.

A12.2. The multi-walled storage tank (10) of paragraph A12, wherein the one or more lobes (88) are preformed in the inner shell (16) of the pressure vessel (12).

A12.3. The multi-walled storage tank (10) of any of paragraphs A12-A12.2, wherein the one or more lobes (88) are separated from each other via an/the internal strut (78).

A13. The multi-walled storage tank (10) of any of paragraphs A9-A12.3, wherein the at least one dedicated external and/or internal structure (34) comprises a tensile net within the inner volume (14) of the pressure vessel (12).

A13.1. The multi-walled storage tank (10) of paragraph A13, wherein the tensile net interconnects an/the at least one concave surface (22) of the inner shell (16)) to a second surface opposite the at least one concave surface (22) and to an/the internal strut (78) within the inner volume (14) of the pressure vessel (12).

A14. The multi-walled storage tank (10) of any of paragraphs A1-A13, wherein the outer shell (18) is configured to be shared with, integrated with, conformed to, and/or nested with one or more aircraft structures.

A15. The multi-walled storage tank (10) of any of paragraphs A1-A14, wherein the outer shell (18) is configured to be shared with, integrated with, conformed to, and/or nested with a fuselage skin of an aircraft (44).

A16. The multi-walled storage tank (10) of any of paragraphs A1-A15, further comprising a plurality of vertex fittings (36) configured to couple the multi-walled storage tank (10) to an/the aircraft structure.

A17. The multi-walled storage tank (10) of any of paragraphs A1-A16, wherein an internal pressure within the inner volume (14) of the pressure vessel (12) is greater than 1 atm.

A18. The multi-walled storage tank (10) of any of paragraphs A1-A17, wherein the inner shell (16) has the same shape as the outer shell (18).

A19. The multi-walled storage tank (10) of any of paragraphs A1-A17, wherein the inner shell (16) has a different shape than the outer shell (18).

A20. The multi-walled storage tank (10) of any of paragraphs A1-A19, wherein the inner shell (16) has a circular cross-sectional shape, and wherein the outer shell (18) has the at least one concave surface (26) and the at least one convex surface (28).

A21. The multi-walled storage tank (10) of any of paragraphs A1-20, wherein the inner shell (16) has a circular cross-sectional shape, and wherein the outer shell (18) has a plurality of concave surfaces (26).

A22. The multi-walled storage tank (10) of any of paragraphs A1-A21, wherein the multi-walled storage tank (10) is configured to be incorporated within, or positioned within, an aerodynamic fairing of an/the aircraft (44).

A23. The multi-walled storage tank (10) of any of paragraphs A1-A22, wherein the pressure vessel (12) is a first pressure vessel (12), wherein the inner volume (14) is a first inner volume (14), wherein the inner shell (16) is a first inner shell (16), and wherein the multi-walled storage tank (10) comprises a second pressure vessel (12') having a second inner volume (14') surrounded by a second inner shell (16).

A24. The multi-walled storage tank (10) of paragraph A23, wherein the first pressure vessel (12) and the second pressure vessel (12') each have a circular cross-sectional area.

A25. The multi-walled storage tank (10) of paragraph A23 or A24, wherein the outer shell (18) surrounds both the first pressure vessel (12) and the second pressure vessel (12').

A26. The multi-walled storage tank (10) of paragraph A25, wherein the outer shell (18) is lobed.

A27. The multi-walled storage tank (10) of paragraph A26, wherein the multi-walled storage tank (10) comprises an internal truss of two-force members (90) separating the first pressure vessel (12) from the second pressure vessel (12'), wherein the internal truss of two-force members (90) are coupled to the outer shell (18) on either side of the first pressure vessel (12) and the second pressure vessel (12').

A28. The multi-walled storage tank (10) of paragraph A26 or A27, wherein the outer shell (18) comprises a plurality of end-supported beam stiffeners (92).

A29. The multi-walled storage tank (10) of any of paragraphs A1-A28, wherein the multi-walled storage tank (10) further comprises a container (38) surrounding the outer shell (18).

A30. The multi-walled storage tank (10) of paragraph A29, wherein the container (38) has a square cross-sectional area.

A31. The multi-walled storage tank (10) of paragraph A29 or A30, wherein the container (38) is configured to be joined with or coupled to a second container (38) for modular multi-walled storage tanks (10).

A32. The multi-walled storage tank (10) of any of paragraphs A29-A31, wherein the outer shell (18) comprises a domed end cap (96).

A33. The multi-walled storage tank (10) of paragraph A32, wherein the domed end cap (96) comprises a concave dome chamfer (98).

A34. The multi-walled storage tank (10) of any of paragraphs A29-A33, wherein the container (38) is configured to support the outer shell (18) at one or more corners and/or one or more edges of the outer shell (18).

A35. The multi-walled storage tank (10) of any of paragraphs A1-A34, wherein the multi-walled storage tank (10) is configured to receive and/or store one or more systems or other components in a space (40) between the outer shell (18) and the container (38).

A35.1. The multi-walled storage tank (10) of any of paragraphs A1-A35 wherein the multi-walled storage tank (10) is configured to receive and/or store one or more systems or other components within the vacuum chamber (20) outside the inner shell (16).

A35.2. The multi-walled storage tank (10) of paragraph A35 or A35.1, wherein the one or more systems or other components comprises a fuel system, a fuel line, piping, valves, heat exchangers, pumps, header tanks, and/or accumulators.

A36. The multi-walled storage tank (10) of any of paragraphs A1-A35.2, wherein the multi-walled storage tank (10) is configured to receive and/or store one or more systems or other components within the vacuum chamber (20).

A37. The multi-walled storage tank (10) of any of paragraphs A1-A36, wherein the multi-walled storage tank (10) is configured to contain fuel, optionally a cryogenic fuel.

B1. A system (42), comprising the multi-walled storage tank (10) of any of paragraphs A1-A37.

B2. The system (42) of paragraph B1, further comprising an/the aircraft (44), wherein the multi-walled storage tank (10) is positioned within, positioned on, and/or coupled to the aircraft (44).

B3. The system (42) of any of paragraphs B1-B2, wherein the multi-walled storage tank (10) shares a wall with an/the aircraft (44).

B4. The system (42) of paragraph B3, wherein the multi-walled storage tank (10) shares the wall with a fuselage skin (50) of the aircraft (44).

B5. The system (42) of any of paragraphs B1-B4, wherein the multi-walled storage tank (10) is positioned in a wake of a belly fairing (46) of an/the aircraft (44).

B6. The system (42) of any of paragraphs B1-B5, wherein an external tension member (76) supporting the multi-walled storage tank (10) is positioned in a space (58) outboard of stanchions (56) on either side of a fuselage (50) of an/the aircraft (44).

B7. The system (42) of any of paragraphs B1-B6, further comprising at least one vertex fitting (36) configured to couple the multi-walled storage tank (10) to one or more aircraft structures.

B8. The system (42) of any of paragraphs B1-B7, wherein at least one multi-walled storage tank (10) is coupled to a lower side (60) of a/the fuselage (50) of an/the aircraft (44).

B9. The system (42) of any of paragraphs B1-B8, wherein at least one multi-walled storage tank (10) is coupled to an upper side (62) of a/the fuselage (50) of an/the aircraft (44).

B10. The system (42) of any of paragraphs B1-B9, further comprising an external tension member (76) extending through a space (70) between overhead bin bays (72) of an/the aircraft (44), wherein the external tension member (76) is coupled to the multi-walled storage tank (10) and configured to support and/or maintain a shape of the multi-walled storage tank (10).

B11. The system (42) of any of paragraphs B1-B10, wherein an/the aircraft (44) comprises a concave aircraft surface (74).

B11.1. The system (42) of paragraph B11, wherein the aircraft (44) comprises a plurality of concave aircraft surfaces (74).

B12. The system (42) of paragraph B11 or B11.1, wherein the multi-walled storage tank (10) is at least partially positioned within the concave aircraft surface (74).

B13. The system (42) of any of paragraphs B11-B12, wherein the multi-walled storage tank (10) is coupled to the aircraft (44) via the concave aircraft surface (74).

B14. The system (42) of any of paragraphs B11-B13, wherein the system (42) comprises a plurality of multi-walled storage tanks (10), each multi-walled storage tank (10) of the plurality of multi-walled storage tanks (10) be coupled to the aircraft (44) via one or more concave aircraft surfaces (74).

B15. The system (42) of any of paragraphs B11-B14, wherein the concave aircraft surface (74) is formed in a/the fuselage (50) of the aircraft (44).

B16. The system (42) of any of paragraphs B1-B15, further comprising a keel beam (100) positioned between adjacent multi-walled storage tanks (10).

B17. The system (42) of any of paragraphs B1-B16, wherein the respective outer shells (18) of adjacent multi-walled storage tanks (10) are coupled together, have a shared wall (106), and/or abut one another.

B18. The system (42) of any of paragraphs B1-B17, further comprising a stringer (104) positioned at an intersection of two concave surfaces (26) of the outer shell (18).

C1: A method (200), comprising: filling (202) the multi-walled storage tank (10) of any of paragraphs A1-A37 with fuel.

C2. The method (200) of paragraphs C1, wherein the fuel is a cryogenic fuel.

C3. The method (200) of any of paragraphs C1-C2, further comprising placing (204) the multi-walled storage tank (10) in or on an aircraft (44).

C4. The method (200) of any of paragraphs C1-C3, further comprising extending or positioning (206) one or more aircraft systems or components through or in the vacuum chamber (20) of the multi-walled storage tank (10).

C5. The method (200) of any of paragraphs C1-C4, further comprising extending or positioning (206) one or more aircraft systems or components through or in a/the space (40) between the outer shell (18) and a/the container (38) surrounding the outer shell (18).

C6. The method (200) of any of paragraphs C1-C5, further comprising coupling the inner shell (16) and the outer shell (18) together via one or more structural couplings (30).

C7. The method (200) of any of paragraphs C1-C6, further comprising forming (208) the multi-walled storage tank (10) and adding at least one dedicated external and/or internal structure (34) configured to counteract one or more deforming forces acting on the multi-walled storage tank (10).

C8. The method (200) of any of paragraphs C1-C7, further comprising integrating and/or nesting the outer shell (18) with one or more aircraft structures.

C9. The method (200) of any of paragraphs C1-C8, further comprising securing a plurality of vertex fittings (36) to the multi-walled storage tank (10) and coupling the multi-walled storage tank (10) to an/the aircraft structure via the plurality of vertex fittings (36).

C10. The method (200) of any of paragraphs C1-C9, further comprising positioning the multi-walled storage tank (10) within a/the container (38), such that the container (38) surrounds the outer shell (18).

C11. The method (200) of any of paragraphs C1-C10, further comprising creating a modular system of multi-walled storage tanks (10) by joining, coupling, and/or stacking a plurality of containers (38), wherein each respective container of the plurality of containers (38) is configured to receive and/or support a respective multi-walled storage tank (10).

C12. The method (200) of any of paragraphs C1-C11, further comprising placing and/or storing one or more systems or other components in a space (40) between the outer shell (18) and a/the container (38) surrounding the outer shell (18).

C13. The method (200) of any of paragraphs C1-C12 further comprising placing and/or storing one or more systems or other components in the vacuum chamber (20) of the multi-walled storage tank (10).

D1. The use of the multi-walled storage tank (10) of any of paragraphs A1-A37 to store and/or transport fuel.

D2. The use of the multi-walled storage tank (10) of any of paragraphs A1-A37 to store and/or transport cryogenic fuel.

D3. The use of the multi-walled storage tank (10) of any of paragraphs A1-A37 to minimize or reduce weight, space, and/or drag of fuel storage systems for aircraft (44).

D4. The use of the multi-walled storage tank (10) of any of paragraphs A1-A37 to integrate the multi-walled storage tank (10) with an aircraft (44).

D5. The use of the system (42) of any of paragraphs B1-B18 to store and/or transport fuel.

D6. The use of the system (42) of any of paragraphs B1-B18 to store and/or transport cryogenic fuel.

D7. The use of the system (42) of any of paragraphs B1-B18 to minimize or reduce weight, space, and/or drag of fuel storage systems for aircraft (44).

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A multi-walled storage tank, comprising:

a pressure vessel comprising an inner volume surrounded by an inner shell, wherein the inner shell comprises at least one concave surface that is both globally and locally concave, and wherein the at least one concave surface extends from a first vertex of the inner shell to a second vertex of the inner shell;

an outer shell surrounding the inner shell; and a vacuum chamber between the inner shell and the outer shell.

2. The multi-walled storage tank according to claim 1, wherein the multi-walled storage tank has a crescent shaped cross-sectional area.

3. The multi-walled storage tank according to claim 1, further comprising an external tension member extending between a first vertex and a second vertex of the outer shell, wherein the external tension member is configured to counteract one or more deforming forces acting on the multi-walled storage tank.

4. The multi-walled storage tank according to claim 1, further comprising one or more internal struts, wherein each internal strut of the one or more internal struts extends within the inner volume of the pressure vessel from the at least one concave surface of the inner shell to a second surface opposite the at least one concave surface, wherein each internal strut of the one or more internal struts is configured to mitigate flattening of the multi-walled storage tank.

5. The multi-walled storage tank according to claim 4, wherein the one or more internal struts comprises a plurality of horizontal struts and a plurality of vertical struts, and wherein each horizontal strut of the plurality of horizontal struts extends from a first vertical strut of the plurality of vertical struts to a second vertical strut of the plurality of vertical struts.

6. The multi-walled storage tank according to claim 1, wherein the outer shell is configured to be shared with, integrated with, conformed to, and/or nested with a fuselage skin of an aircraft.

7. The multi-walled storage tank according to claim 6, further comprising a plurality of vertex fittings configured to couple the multi-walled storage tank to the fuselage skin.

8. The multi-walled storage tank according to claim 1, wherein the multi-walled storage tank is configured to contain a cryogenic fuel.

9. An aircraft comprising the multi-walled storage tank according to claim 1, wherein the multi-walled storage tank is coupled to the aircraft, wherein the multi-walled storage tank shares a wall with a fuselage skin of the aircraft.

10. A multi-walled storage tank, comprising:

a pressure vessel comprising an inner volume surrounded by an inner shell, wherein the inner shell comprises at least one concave surface;

an outer shell surrounding the inner shell;

a vacuum chamber between the inner shell and the outer shell; and at least one structural coupling between the inner shell and the outer shell at one or more vertices of the multi-walled storage tank, wherein the at least one structural coupling is configured to partially or fully cancel out deforming forces experienced by the multi-walled storage tank.

11. The multi-walled storage tank according to claim 10, wherein the outer shell is configured to be shared with, integrated with, conformed to, and/or nested with a fuselage skin of an aircraft.

12. The multi-walled storage tank according to claim 11, further comprising a plurality of vertex fittings configured to couple the multi-walled storage tank to the fuselage skin.

13. The multi-walled storage tank according to claim 10, wherein the multi-walled storage tank has a crescent shaped cross-sectional area.

14. The multi-walled storage tank according to claim 10, further comprising an external tension member extending between a first vertex and a second vertex of the outer shell, wherein the external tension member is configured to counteract one or more deforming forces acting on the multi-walled storage tank.

15. The multi-walled storage tank according to claim 10, further comprising one or more internal struts, wherein each internal strut of the one or more internal struts extends within the inner volume of the pressure vessel from the at least one concave surface of the inner shell to a second surface opposite the at least one concave surface, wherein each internal strut of the one or more internal struts is configured to mitigate flattening of the multi-walled storage tank.

16. An aircraft comprising the multi-walled storage tank according to claim 10, wherein the multi-walled storage tank is coupled to the aircraft, wherein the multi-walled storage tank shares a wall with a fuselage skin of the aircraft.

17. A multi-walled storage tank, comprising:

a pressure vessel comprising an inner volume surrounded by an inner shell;

an outer shell surrounding the inner shell, wherein the outer shell comprises at least one concave surface;

a vacuum chamber between the inner shell and the outer shell; and a container surrounding the outer shell, wherein the container is configured to support the outer shell at one or more corners of the outer shell, and wherein the multi-walled storage tank is configured to receive and store one or more aircraft systems or components in a space between the outer shell and the container.

18. The multi-walled storage tank according to claim 17, wherein the inner shell has a circular cross-sectional shape, and wherein the outer shell has a plurality of concave surfaces.

19. The multi-walled storage tank according to claim 17, wherein the pressure vessel is a first pressure vessel, wherein the inner volume is a first inner volume, wherein the inner shell is a first inner shell, wherein the multi-walled storage tank further comprises a second pressure vessel having a second inner volume surrounded by a second inner shell, and wherein the outer shell surrounds both the first pressure vessel and the second pressure vessel.

20. An aircraft comprising the multi-walled storage tank according to claim 17, wherein the aircraft comprises a concave aircraft surface, and wherein the multi-walled storage tank is coupled to the aircraft via the concave aircraft surface.

* * * * *